US012682451B2

(12) United States Patent
De Sisternes

(10) Patent No.: US 12,682,451 B2
(45) Date of Patent: Jul. 14, 2026

(54) QUALITY MAPS FOR OPTICAL COHERENCE TOMOGRAPHY ANGIOGRAPHY

(71) Applicants:Carl Zeiss Meditec, Inc., Dublin, CA (US); Carl Zeiss Meditec AG, Jena (DE)

(72) Inventor: Luis De Sisternes, San Franciso, CA (US)

(73) Assignees: CARL ZEISS MEDITEC, INC., Dublin, CA (US); CARL ZEISS MEDITEC AG, Jena (DE)

( * ) Notice: Subject to any disclaimer, the term of this patent is extended or adjusted under 35 U.S.C. 154(b) by 163 days.

(21) Appl. No.: 18/035,492

(22) PCT Filed: Nov. 29, 2021

(86) PCT No.: PCT/EP2021/083302
§ 371 (c)(1),
(2) Date: May 4, 2023

(87) PCT Pub. No.: WO2022/112546
PCT Pub. Date: Jun. 2, 2022

(65) Prior Publication Data
US 2023/0410293 A1    Dec. 21, 2023

Related U.S. Application Data

(60) Provisional application No. 63/233,033, filed on Aug. 13, 2021, provisional application No. 63/119,377, filed on Nov. 30, 2020.

(51) Int. Cl.
*G06T 7/00* (2017.01)
*G06T 7/40* (2017.01)

(52) U.S. Cl.
CPC .............. *G06T 7/0012* (2013.01); *G06T 7/40* (2013.01); *G06T 2207/10101* (2013.01);
(Continued)

(58) Field of Classification Search
CPC .................... G06T 7/0012; G06T 7/40; G06T 2207/10101; G06T 2207/20081;
(Continued)

(56) References Cited

U.S. PATENT DOCUMENTS 9,700,206 B2    7/2017    An et al.
2020/0273218 A1    8/2020    Camino et al.
(Continued)

FOREIGN PATENT DOCUMENTS

CN    103269439    8/2013
CN    109859199    6/2019
(Continued)

OTHER PUBLICATIONS

Sengar, Neha, et al. "EyeDeep-Net: A multi-class diagnosis of retinal diseases using deep neural network." Neural Computing and Applications 35.14 (2023): 10551-10571. (Year: 2023).*
(Continued)

*Primary Examiner* — Matthew C Bella
(74) *Attorney, Agent, or Firm* — SNELL & WILMER L.L.P.

(57) ABSTRACT

A system, method, and/or device for determinizing a quality measure of OCT structural data and/or OCTA functional data uses a machine learning model trained to provide a single overall quality measure, or a quality map distribution for the OCT/OCTA data based on the generation of multiple features maps extracted from one or more slab views of the OCT/OCTA data. The extracted feature maps may be different texture-type maps, and the machine model is trained to determine the quality measure based on the texture maps.

16 Claims, 25 Drawing Sheets

(52) U.S. Cl.
CPC .............. *G06T 2207/20081* (2013.01); *G06T 2207/20084* (2013.01); *G06T 2207/30041* (2013.01); *G06T 2207/30101* (2013.01); *G06T 2207/30168* (2013.01)

(58) Field of Classification Search
CPC . G06T 2207/20084; G06T 2207/30041; G06T 2207/30101; G06T 2207/30168
See application file for complete search history.

(56) References Cited

U.S. PATENT DOCUMENTS

| | | | |
|---|---|---|---|
| 2020/0394789 A1* | 12/2020 | Freund ................. | G06T 7/0012 |
| 2023/0196532 A1* | 6/2023 | Bagherinia ............. | A61B 3/12 |
| | | | 382/131 |

FOREIGN PATENT DOCUMENTS

| | | |
|---|---|---|
| JP | 2017144047 | 8/2017 |
| JP | 2019213740 | 12/2019 |
| JP | 2020058629 | 4/2020 |
| JP | 2020518915 | 6/2020 |
| WO | 2008126151 | 10/2008 |
| WO | 2020064777 | 4/2020 |
| WO | 2022112546 | 6/2022 |

OTHER PUBLICATIONS

Chan, Y.M. "Machine learning techniques for detection of glaucoma with optical coherence tomography angiography images", Nanyang Technical Univ., Sep. 2020. (Year: 2020).*

Li, Ang et al. "Deep Learning based motion correction in optical coherence tomography angiography." Journal of biophotonics 14.12 (2021) (Year: 2021).*

Zhang, Pengfei, et al. "Adaptive optics scanning laser ophthalmoscopy and optical coherence tomography (AO-SLO-OCT) system for in vivo mouse retina imaging." Biomedical Optics Express 14.1 (2022): 299-314. (Year: 2022).*

Gayathri, S., et al. "Automated binary and multiclass classification of diabetic retinopathy using haralick and multiresolution features." IEEE Access 8 (2020): 57497-57504. (Year: 2020).*

Costa, P. et al. "EyeQual: Accurate, Explainable, Retinal Image Quality Assessment" 017 16th IEEE International Conference on Machine Learning and Applications (Icmla), Dec. 1, 2017 (Dec. 1, 2017), p. 323-330.

Remeseiro, B. et al. "Objective quality assessment of retinal images based on texture features"2017 International Joint Conference On Neural Networks (IJCNN), IEEE, May 14, 2017 (May 14, 2017), p. 4520-4527.

Elezaby. S et al. "A machine learning method for optical coherence tomography scan quality assessment" Investigative Ophthalmology & Visual Science; Annual Meeting of the Association-For-Research-In-Vision-And-Ophthalmology (ARVO); May 1 -7, 2020, Association for Research in Vision and Ophthalmology, US, vol. 61, No. 9, Jul. 31, 2020 (Jul. 31, 2020), p. PB0090.

Wu, C. "AI Quantification of OCTA en face image quality" IOVS, vol. 60, No. 11, Aug. 2019 (Aug. 2019), p. PB099.

Soliz, P. et al. "Impact of retinal image quality: software aid for a low-cost device and effects on disease detection" Progress in Biomedical Optics and Imaging, SPIE—International Society for Optical Engineering, Bellingham, WA, US, vol. 10858, Feb. 28, 2019 (Feb. 28, 2019), p. 1085829-1085829.

International Bureau, International Search Report and Written Opinion dated Mar. 29, 2022 in International Application Serial No. PCT/EP2021/083302.

Japanese Patent Office, Japanese Search Report dated Sep. 24, 2025 in Application No. 2023-530914.

Perez Andres D., et al., "A Lightweight Deep Learning Model for Mobile Eye Fundus Image Quality Assessment", Proceedings of SPIE, Jul. 31, 2020, vol. 11330, pp. 113300K-1-113300K-8, doi: 10.1117/12.2547126.

Japanese Patent Office, Japanese Office Action dated Sep. 24, 2025 in Application No. 2023-530914.

Chinese Patent Office, Chinese Search Report dated Aug. 5, 2025 in Application No. 2021800788323.

Chinese Patent Office, Chinese Office Action dated Aug. 7, 2025 in Application No. 2021800788323.

Indian Patent Office, Indian Office Action dated May 26, 2026 in Application No. 202317042799.

\* cited by examiner

INPUT IMAGE
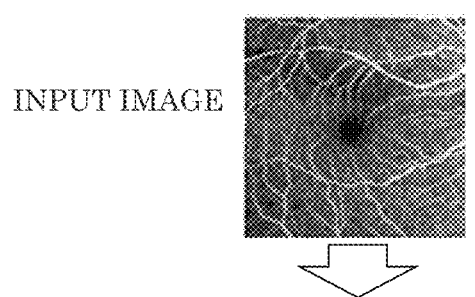
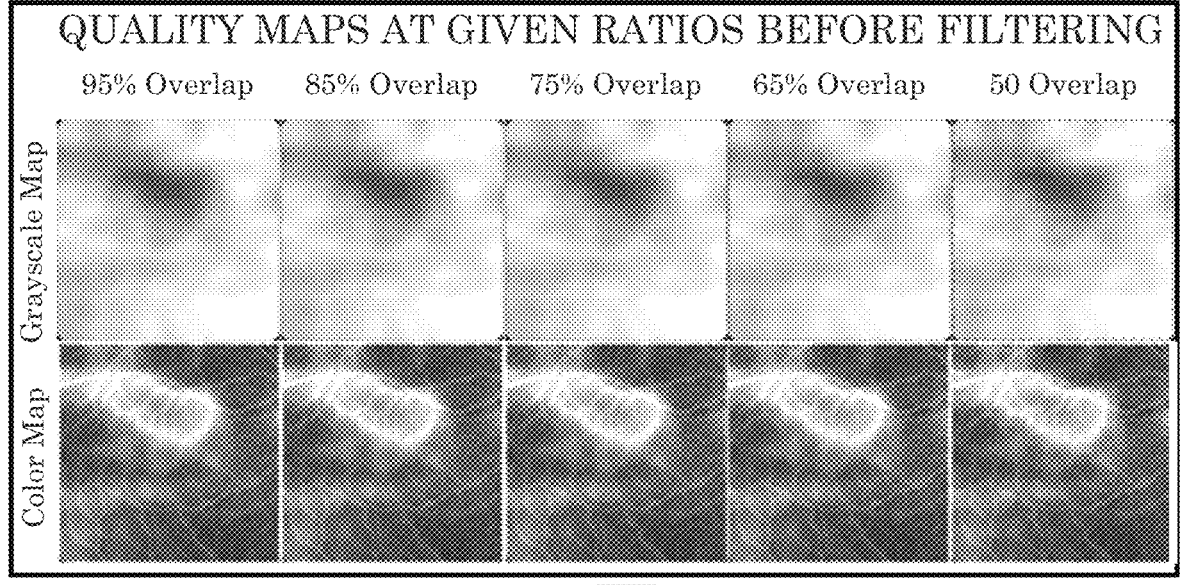
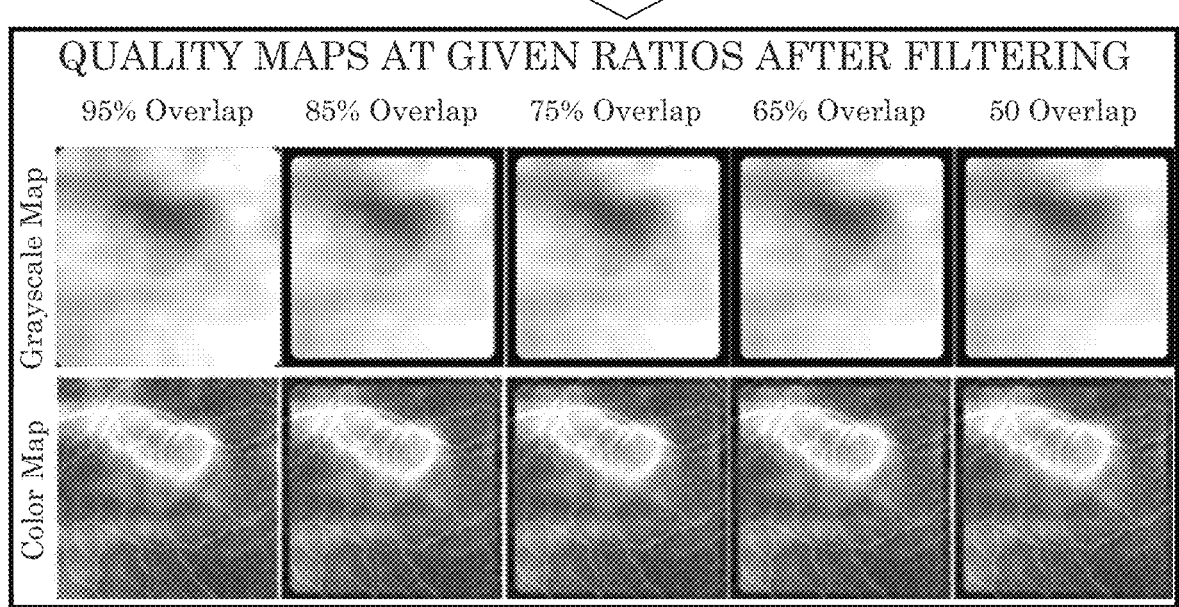
FIG. 4

Figure 6A:
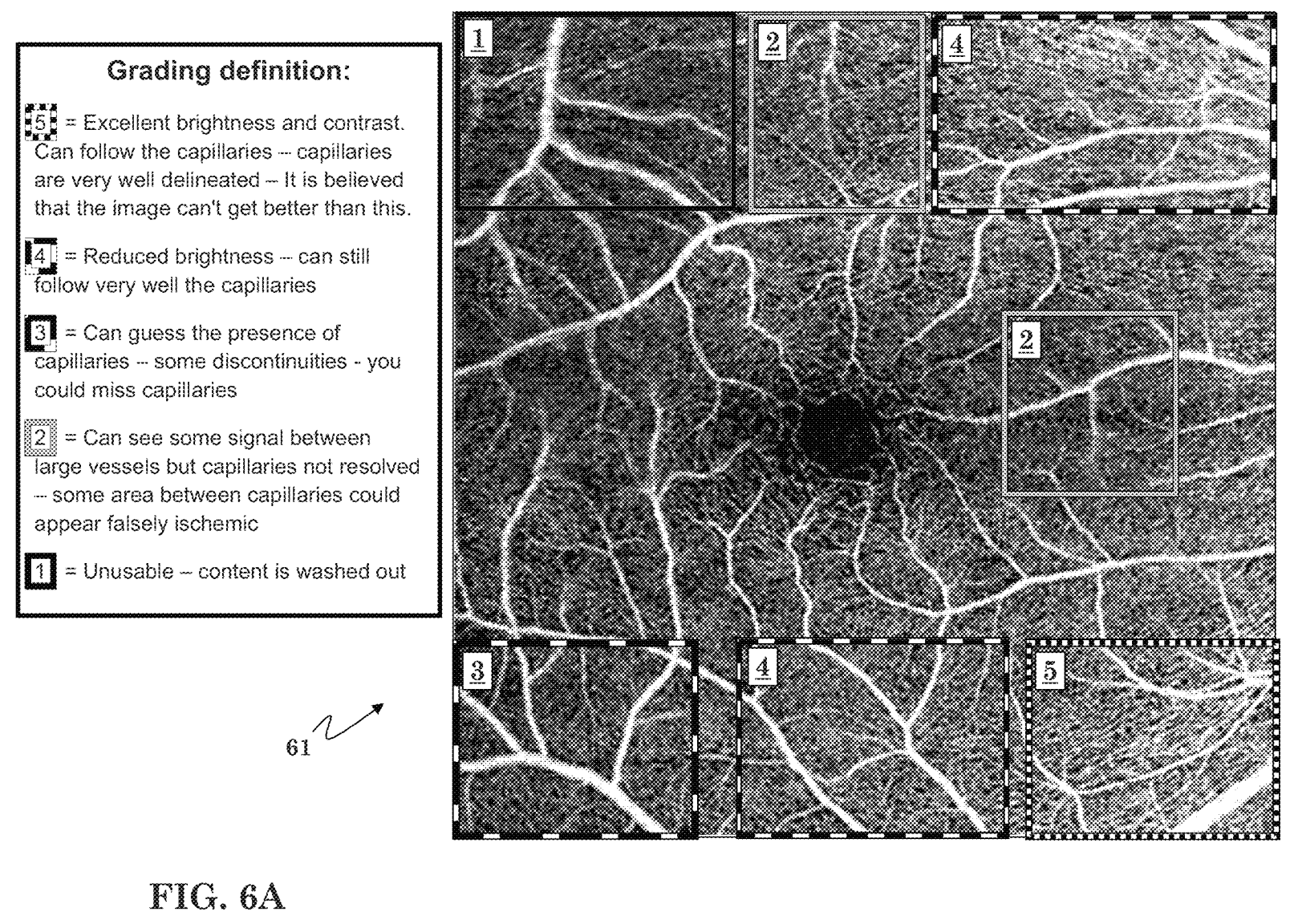

Grading definition:

[5] = Excellent brightness and contrast. Can follow the capillaries -- capillaries are very well delineated -- it is believed that the image can't get better than this.

[4] = Reduced brightness -- can still follow very well the capillaries

[3] = Can guess the presence of capillaries -- some discontinuities -- you could miss capillaries

[2] = Can see some signal between large vessels but capillaries not resolved -- some area between capillaries could appear falsely ischemic

[1] = Unusable -- content is washed out

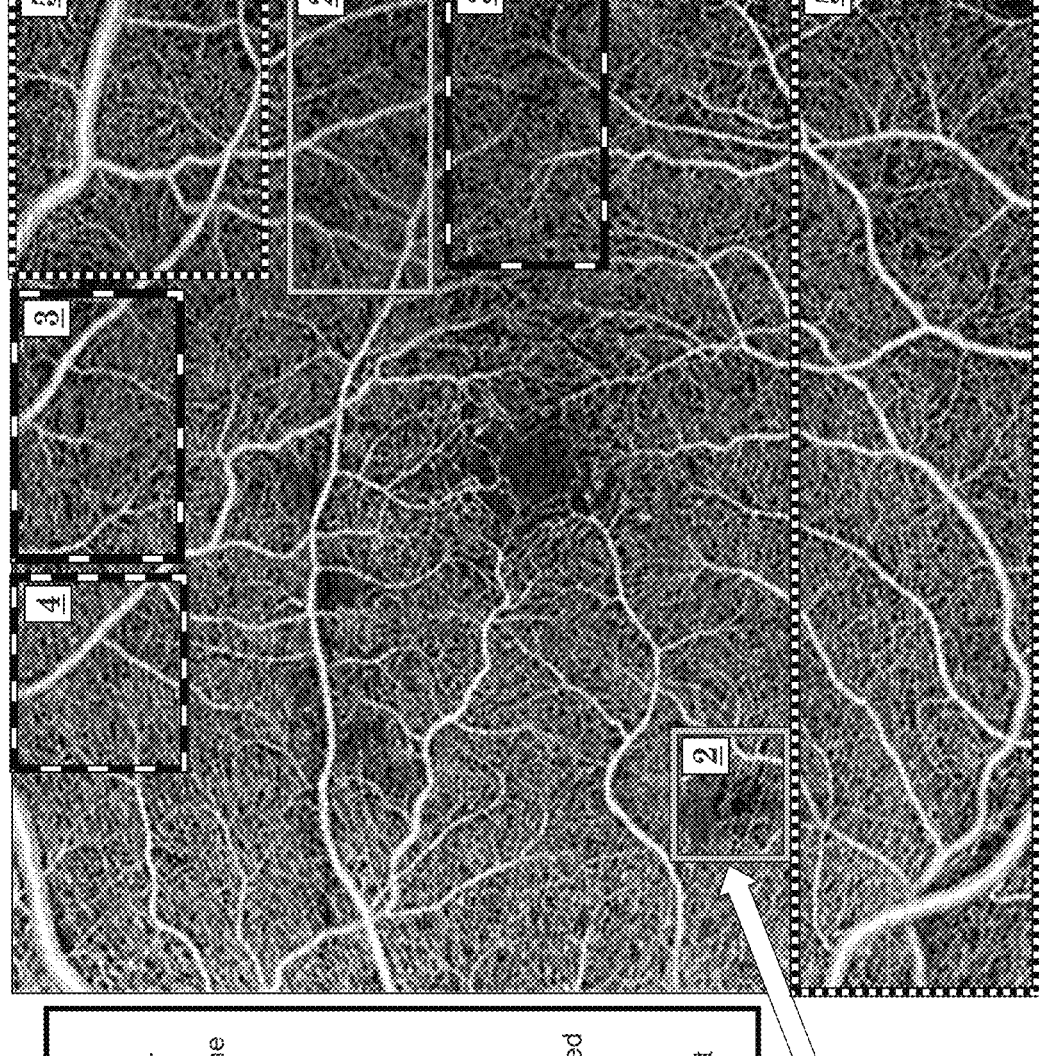

Grading definition:

5 = Excellent brightness and contract. Can follow the capillaries – capillaries are very well delineated – we believe the image can't get better than this 4 = Reduced brightness or contrast – can still follow very well the capillaries 3 = Can guess the presence of capillaries – some discontinuities – you could miss capillaries 2 = Can see some signal between large vessels but capillaries not resolved – some area between capillaries could appear falsely ischemic 1 = Unusable – content is washed out Artifact as a result of a floater – artifact is not present on other scans

FIG. 6B

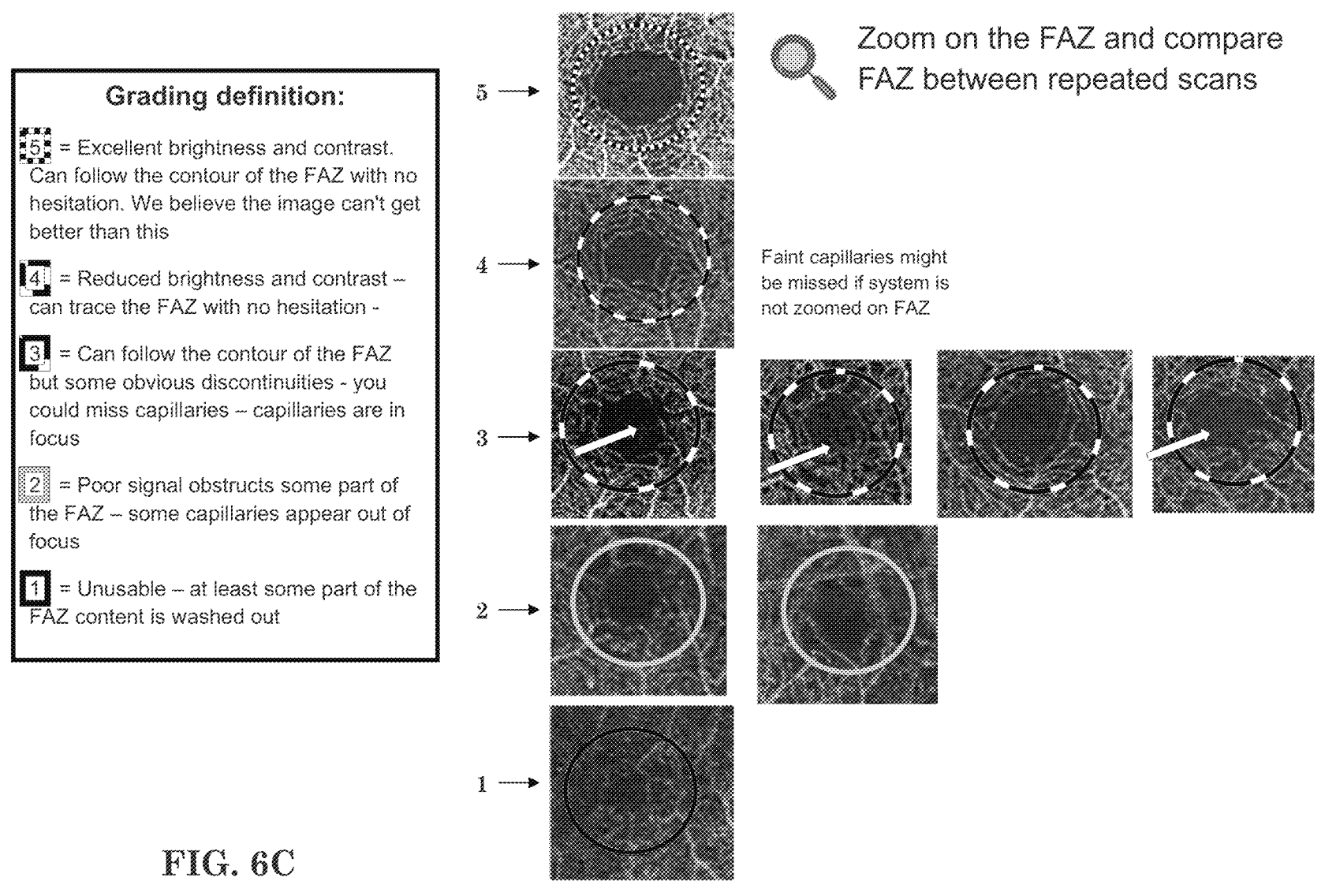

Zoom on the FAZ and compare
FAZ between repeated scans

Faint capillaries might
be missed if system is
not zoomed on FAZ

Grading definition:

5 = Excellent brightness and contrast.
Can follow the contour of the FAZ with no
hesitation. We believe the image can't get
better than this 4 = Reduced brightness and contrast –
can trace the FAZ with no hesitation -

3 = Can follow the contour of the FAZ
but some obvious discontinuities - you
could miss capillaries – capillaries are in
focus 2 = Poor signal obstructs some part of
the FAZ – some capillaries appear out of
focus 1 = Unusable – at least some part of the
FAZ content is washed out

FIG. 6C

Grading Nasal sector

Grading definition:

5 = Excellent brightness and contrast. Can follow the RNFL – RNFL are very well delineated - we believe the image can't get better than this

4 = Reduced contrast– can still recognize RNFL pattern

3 = Can guess the presence of RNFL – some discontinuities - you can guess there are RNFL capillaries – difficult to trace individual capillaries

2 = Can see some signal between large vessels but RNFL can't be resolved – some area could appear falsely ischemic

1 = Unusable – medium vessel are blurry – content appears washed out

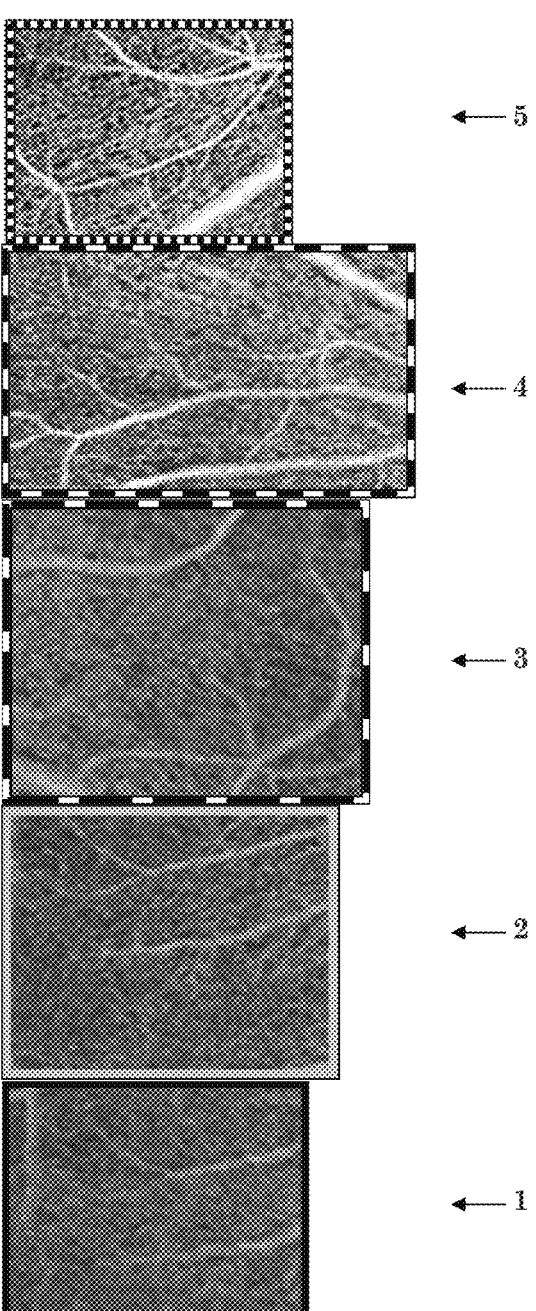

Retina OCTA *En Face*    Smooth Avg. Grader Map    Algorithm Quality Map    Difference of Avg. Grader and Algorithm, (1-5)    Regions where Difference > 1

111    112    113    114    115

GIVEN vs PREDICTED SCORES IN TRAINING DATA
(Overall Model, N = 6,500,000)

FAIL% FOR A GIVEN RATIO OF DIFFERENCE > 1
Failure percentage for error larger then 1

Example results in different 3x3mm OCTA acquisitions from the same patient

Example results in different 3x3mm OCTA acquisitions from the same patient

Example results OCTA acquisition of the same eye for different scan sizes: 3x3mm (top left), 6x6mm (bottom left), 9x9mm (top right), 12x12mm (bottom right).

| Comparison | | Ground Truth = Avg. of Graders 1, 2, and 3 |
|---|---|---|
| Grader 1 | | 80.77% |
| Grader 2 | | 92.31% |
| Grader 3 | | 96.15% |
| Automated | | 88.46% |

| Comparison | | Gnd. Truth = Avg. of Graders 2,3 | Gnd. Truth = Avg. of Graders 1,3 | Gnd. Truth = Avg. of Graders 1,2 |
|---|---|---|---|---|
| Grader 1 | | 29.92% | - | - |
| Grader 2 | | - | 15.38% | -- |
| Grader 3 | | - | - | 23.08% |
| Automated | | 69.23% | 88.46% | 76.92% |

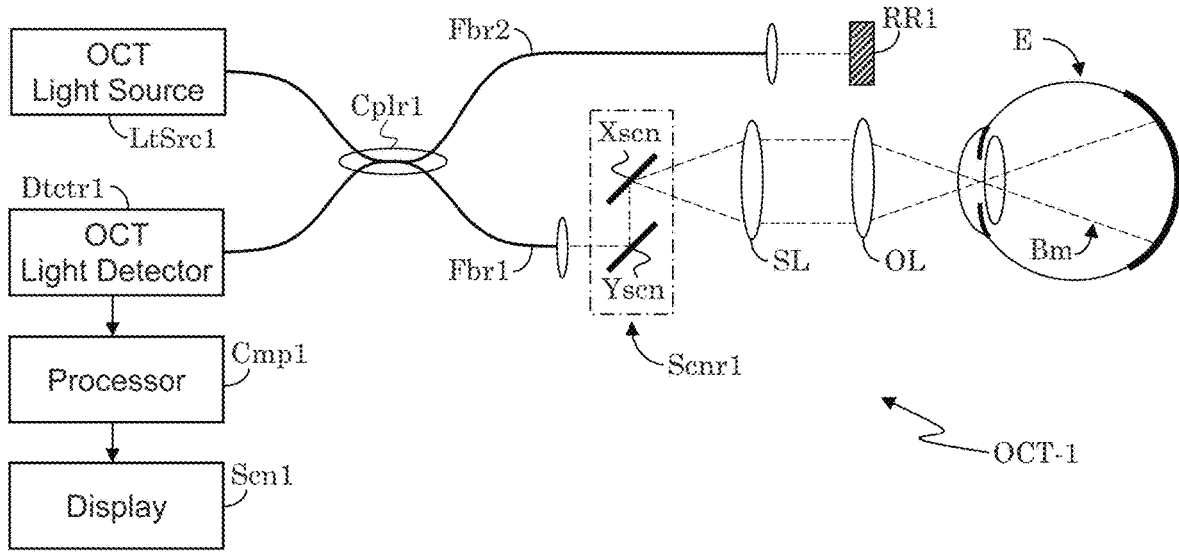
FIG. 19
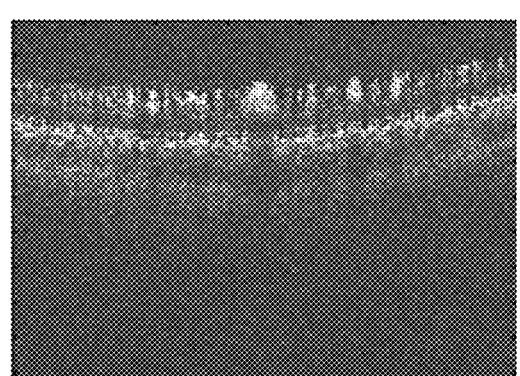
FIG. 22
FIG. 21

FIG. 20

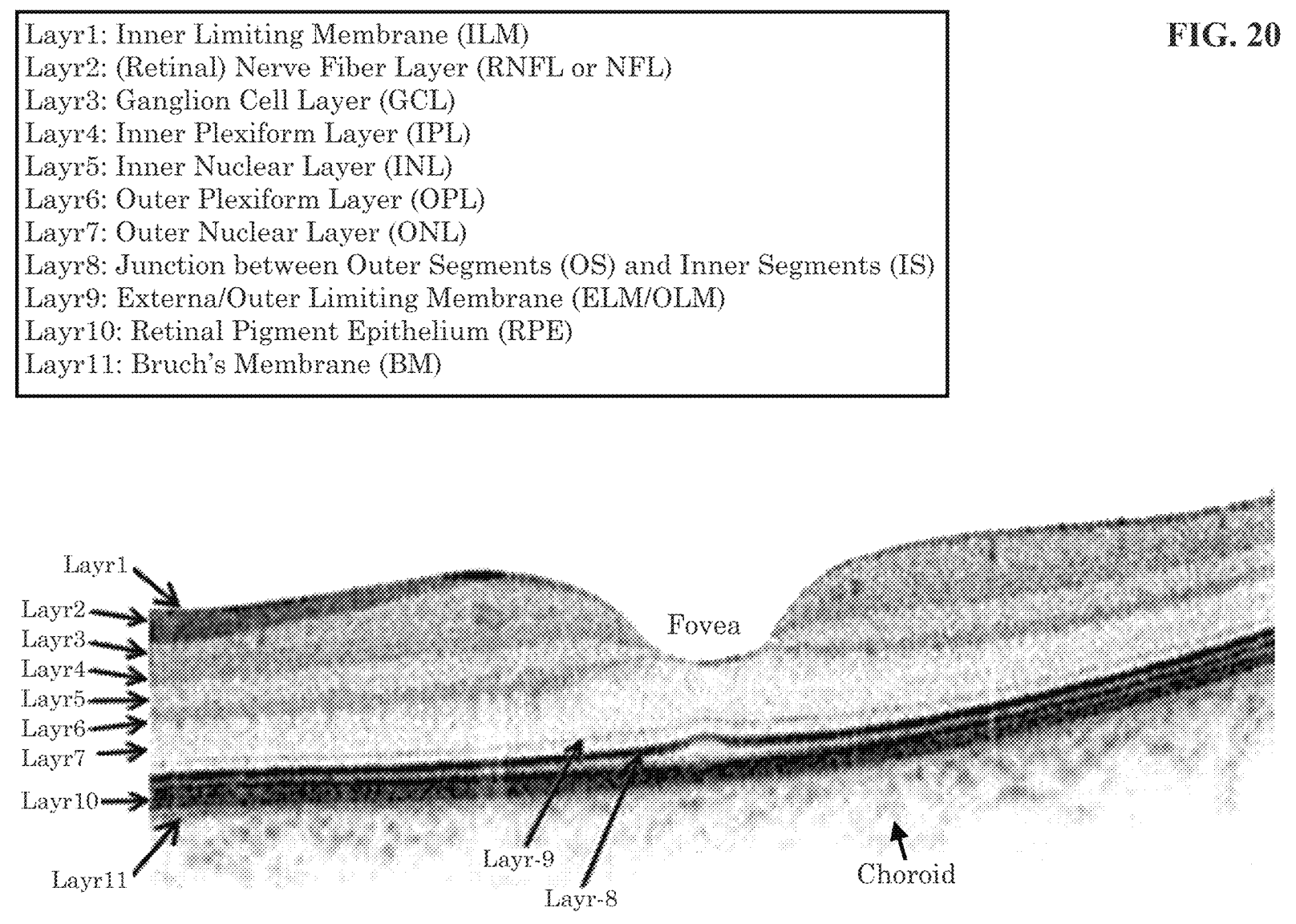

Layr1: Inner Limiting Membrane (ILM)
Layr2: (Retinal) Nerve Fiber Layer (RNFL or NFL)
Layr3: Ganglion Cell Layer (GCL)
Layr4: Inner Plexiform Layer (IPL)
Layr5: Inner Nuclear Layer (INL)
Layr6: Outer Plexiform Layer (OPL)
Layr7: Outer Nuclear Layer (ONL)
Layr8: Junction between Outer Segments (OS) and Inner Segments (IS)
Layr9: External/Outer Limiting Membrane (ELM/OLM)
Layr10: Retinal Pigment Epithelium (RPE)
Layr11: Bruch's Membrane (BM)

QUALITY MAPS FOR OPTICAL COHERENCE TOMOGRAPHY ANGIOGRAPHY

CROSS REFERENCE TO RELATED APPLICATIONS

This application is a U.S. national stage entry under 35 U.S.C. § 371 of International Application No. PCT/EP2021/083302 filed Nov. 29, 2021 entitled "QUALITY MAPS FOR OPTICAL COHERENCE TOMOGRAPHY ANGIOGRAPHY", which claims priority to, and the benefit of, U.S. Provisional Application Ser. No. 63/119,377 filed on Nov. 30, 2020, entitled "QUALITY MAPS FOR OPTICAL COHERENCE TOMOGRAPHY ANGIOGRAPHY," and claims priority to, and the benefit of, U.S. Provisional Application Ser. No. 63/233,033 filed on Aug. 13, 2021 entitled "QUALITY MAPS FOR OPTICAL COHERENCE TOMOGRAPHY ANGIOGRAPHY." Each of the foregoing applications are hereby incorporated by reference in their entirety for all purposes.

FIELD OF INVENTION

The present invention is generally directed to optical coherence tomography (OCT) systems. More specifically, it is directed to methods of determining quality measures of OCT and OCT angiography scans, and generating quality maps.

BACKGROUND

Optical coherence tomography (OCT) is a non-invasive imaging technique that uses light waves to penetrate tissue and produce image information at different depths within the tissue. Basically, an OCT system is an interferometric imaging system that determines a scattering profile of a sample along an OCT beam by detecting the interference of light reflected from the sample and a reference beam to create a three-dimensional (3D) representation of the sample. Each scattering profile in the depth direction (e.g., z-axis or axial direction) may be reconstructed individually into an axial scan, or A-scan. Cross-sectional slice images (e.g., two-dimensional (2D) bisecting scans, or B-scans) and volume images (e.g., three-dimensional (3D) cube scans, or C-scans) may be built up from multiple A-scans acquired as the OCT beam is scanned/moved through a set of transverse (e.g., x-axis and y-axis) locations on the sample. An OCT system also permits construction of a planar, frontal view (e.g., en face) image of a select portion of a tissue volume (e.g., a target tissue slab view (sub-volume) or target tissue layer(s), such as the retina of an eye).

Within the ophthalmic field, OCT systems were initially developed to provide structural data, such as cross-section images of retinal tissue, but today may provide functional information as well, such as flow information. Whereas OCT structural data permits one to view the distinctive tissue layers of the retina, OCT angiography (OCTA) expands the functionality of an OCT system to also identify (e.g., render in image format) the presence, or lack, of blood flow in retinal tissue. For example, OCTA may identify blood flow by identifying differences over time (e.g., contrast differences) in multiple OCT scans of the same retinal region, and designating differences that meet predefined criteria as blood flow. Although data produced by an OCT system (e.g., OCT data) could include both OCT structural data and OCT flow data, depending on the functionality of the OCT system, for ease of discussion, unless otherwise stated or understood from context, OCT structural data may herein be termed "OCT data" and OCT angiography (or flow) data may herein be termed "OCTA data". Thus, OCT may be said to provide structural information, whereas OCTA provides flow (e.g., functional) information. However, since both OCT data and OCTA data may be extracted from the same one or more OCT scan, the term "OCT scan" may be understood to include an OCT structural scan (e.g., OCT acquisition) and/or an OCT functional scan (e.g., OCTA acquisition), unless otherwise stated. A more in-depth discussion of OCT and OCTA is provided below.

OCTA provides valuable diagnostic information not found in structural OCT, but OCTA scans may suffer from acquisition issues that can make their quality sub-optimal. Prior attempts to quantify OCT scan quality focus on OCT structural data and generally depend upon a signal strength measurement, such as described in "A new quality assessment parameter for optical coherence tomography," by D. M. Stein et al., *Br J Ophthalmol*, 2006, Although signal strength measurements for assessing OCT structural data have found utility, such approaches are of limited use in OCTA data due to the quality of the derived flow information being dependent upon on many other factors that are not included in such quantifications.

Consequently, OCTA scan quality is often determined subjectively by observers in order to determine whether a particular OCTA acquisition (e.g., OCTA scan) can be used for diagnosis or included in a broad study. Examples of this approach are found in: "Determinants of Quantitative Optical Coherence Tomography Angiography Metrics in Patients with Diabetes," by Tang F Y et al., *Scientific Reports,* 2018; 8:7314; "Swept Source Optical Coherence Tomography Angiography for Contact Lens-Related Corneal Vascularization", by Ang M et al., *Journal of Ophthalmology,* 2016, 2016, 9685297; and "Impact of eye-tracking technology on OCT-angiography imaging quality in age-related macular degeneration," by Lauermann et al., *Graefes Arch Clin Exp Ophthalmol,* 2017, 255: 1535. These approaches, however, are extremely subjective and time consuming. In addition, subjective quality is often assessed after a patient examination during a-posteriori scan review when a patient has left a clinic, making it impossible to try and acquire an additional scan of better quality to replace low-quality data and causing loss of data or uncertain diagnosis. Even with operators that can actively judge the quality of OCTA scans during acquisition while the patient is still in the clinic, there is no guidance currently available with a quantitative quality score that would help establish an objective quality cut-off measure for rescanning or for increasing the quality of subsequent acquisitions.

It is an object of the present invention to provide a system/device/method for providing an objective quality measure of OCT/OCTA data.

It is another object of the present invention to provide a quick determination of when an OCT/OCTA scan is of insufficient quality and may need to be retaken.

It is a further object of the present invention to provide a quality measure of OCTA data on a A-scan by A-scan basis.

It is still another object of the present invention to provide a (e.g., 2D or 3D) quality map of OCTA data that visually identifies portions of an OCTA scan that may be of poor quality, e.g., as determined by the present system/method/device.

SUMMARY OF INVENTION

The above objects are met in a method/system/device for identifying low quality OCT scans (or portions of low quality within OCT scans, e.g., OCT structural scans and/or OCTA functional scans), identifying possible sources of the low quality, and recommending (or implementing) corrective action for improving a subsequent OCT scan. Additionally, quality maps of the OCT scan may also be provided.

For example, the present system/method/device may provide one or more, e.g., 2D and/or 3D, quantitative quality map that describe the quality of an OCT/OCTA acquisition, e.g., at each en face location (e.g., pixel or pixel region/window location). The resulting quality map(s) correlate well with subjective quality measures (e.g., provided by human testers) observed in slabs generated from the acquisition at corresponding en face locations. Optionally, the values in the quality map may be averaged to provide an overall quality score for the acquisition, which has also been found to correlate well with subjective quality grades. This is opposed to previous quality assessing approaches that determined a measurement of overall signal strength recorded in the OCT structure component compared to a noise baseline. Such previous approaches do not provide a reliable quality value for OCTA flow component or location-specific quality values. The attached claims describe the invention in more detail.

The system/method/device may also identify and output one or more possible sources/reasons for a low quality acquisition, or region of low quality. For example, the system/method/device may identify the source of a low quality acquisition as incorrect focusing, opacities (e.g., cataracts or floaters of opaque media), illumination below a predefined threshold (such as may be caused by a small pupil), tracking issues (such as due to blinking), and suggest corrective action(s), such as correcting/adjusting the focus, suggesting an alternate imaging angle to avoid opacities, identifying the need for pupil dilation, and identifying a possible reason for loss of eye tracking. This information can be used to provide recommendations to a system operator (or to an automated/semi-automated sub-system within the OCT system) during data acquisition, which may be used for the acquisition of a repeated scan for achieving better image quality. For example, the OCT system may use the information to automatically (or semi-automatically, such as in response to an OK-input signal from the system operator) to take the recommended corrective action(s) to improve a subsequent scan acquisition.

Other objects and attainments together with a fuller understanding of the invention will become apparent and appreciated by referring to the following description and claims taken in conjunction with the accompanying drawings.

Several publications may be cited or referred to herein to facilitate the understanding of the present invention. All publications cited or referred to herein, are hereby incorporated herein in their entirety by reference.

The embodiments disclosed herein are only examples, and the scope of this disclosure is not limited to them. Any embodiment feature mentioned in one claim category, e.g., system, device, or method, can be claimed in another claim category, e.g., system, device, or method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

Priority applications U.S. Ser. No. 63/119,377 and 63/233,033 contain at least one color drawing and are hereby incorporated by reference.

In the drawings like reference symbols/characters refer to like parts:

FIG. 4 illustrates the effect of reducing the overlap ratio, such as to increase computational speed, and the application of the present Gaussian filtering.

FIGS. 6A to 6E illustrate various exemplary guidelines for grading the quality of flow images using a 1-5 scale.

FIG. 19 illustrates a generalized frequency domain optical coherence tomography system used to collect 3D image data of the eye suitable for use with the present invention.

FIG. 20 shows an exemplary OCT B-scan image of a normal retina of a human eye, and illustratively identifies various canonical retinal layers and boundaries.

FIG. 21 shows an example of an en face vasculature image.

FIG. 22 shows an exemplary B-scan of a vasculature (OCTA) image.

DESCRIPTION OF THE PREFERRED EMBODIMENTS

Figures 1, 3:
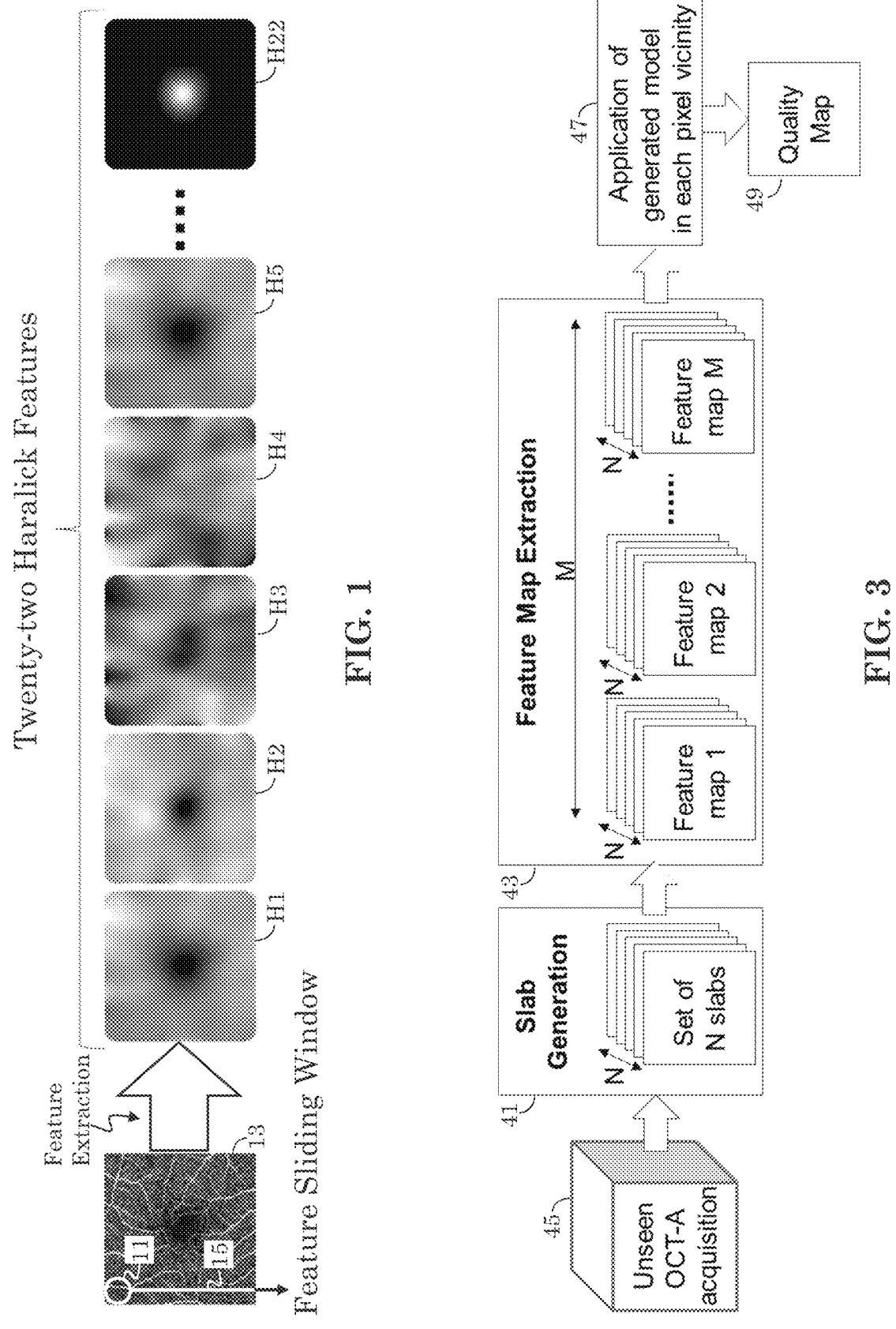
FIG. 1 illustrates a set of Haralick features extracted in a circular vicinity of 250 microns with a pixel-by-pixel sliding window from a retina flow slab.
FIG. 3 provides a representation of an exemplary application (or test) stage workflow in accord with the present invention.

Optical Coherence Tomography (OCT) system scans may suffer from acquisition issues that can ill-affect the acquisition/scan quality. Such issues may include, among others: incorrect focusing, the presence of floaters of opaque media, low illumination (e.g., signal strength less than 6 on a scale from 0 to 10), low light penetration (e.g., less than half a target penetration value, or less than 5 μm), tracking/motion artifacts, and/or the presence of high noise (e.g., a root mean square noise value above a predefined threshold). These issues may adversely affect the quality of OCT system data, such as shown in B-scans or en face views (e.g., in the form of slabs), and may adversely affect the precision of data extraction (or image processing) techniques or algorithms applied to the OCT system data, such as segmentation or vessel density quantification techniques. Thus, low quality OCT system data, particularly OCTA data, may potentially make a correct diagnosis difficult. There is therefore a need for assessing the quality of acquired OCT/OCTA scans in a quantitative manner, so as to quickly determine the scan's viability, or usefulness.

The quality of OCT structural data is typically determined based on an overall signal strength value. Typically, if the overall signal strength value is below a predetermined threshold, the entire OCT structural scan is deemed bad, e.g., a failed scanned. Thus, quality measures based on signal strength only provide (e.g., output) a single quality value/measure for the whole volume field-of-view (FOV), but this approach is not a reliable method to adapt when attempting to assess the quality of, e.g., en face, images whose structural information varies from one scan location to another. This approach is also particularly ill-suited for assessing the quality of OCTA acquisitions, which provide functional, flow information, not structural information. Thus, it is Applicant's understanding that there is no commercially available method to automatically and quantitatively assess the quality of flow information in OCTA scans, either as a unique value per scan or in the form of quality maps.

Herein is provided a system and method for generating quality maps for OCT system data, whose quality measure may vary across an entire acquisition (e.g., across a desired FOV). Some portions of the present discussion may describe the present invention as applied to one or another of OCT structural data or OCTA flow data, but it is to be understood that, unless otherwise stated, the invention description may also be applied to the other of the OCT structural data or OCTA flow data.

The present invention provides a system and method for quantitively measuring the relative quality of OCT system data at each of multiple image-quality locations/positions (e.g., at each scan position (e.g., each A-scan position) or each quality-measurement window location (or pixel neighborhood) which may span multiple A-scan positions) in the OCT system data. Although the present quality assessment approach may be applied to any OCT system data viewing/imaging technique (e.g., en face, A-scan, B-scan, and/or C-scan images), for ease of discussion, the present approach is herein primarily described as applied to en face images (unless otherwise stated) with the understanding that the same (or substantially similar as would be understood by one versed in the art) approach/technique may be applied to any other OCT system data viewing/imaging techniques (e.g., A-scan, B-scan, and/or C-scan images).

The present system/method may assess a set of texture properties of OCT/OCTA data in the vicinity of each image-quality location, e.g., each en face location (e.g., pixel or image-quality window or pixel neighborhood), and assign the location (and/or vicinity) a quantitative quality score that correlates with scan quality. In the case of an en face image, the result is a two-dimensional quality map that describes the quality of the scan at each en face location, such as by use of a color-code (or grayscale-code) indicative of image quality.

This quality map may be used to judge/determine/compute the quality of an individual scan across its FOV, to quantify the difference in quality among several acquisitions (e.g., OCT system scan acquisitions) of the same subject at each en face location, and/or to provide an overall quality metric (e.g., measure) for each acquisition, such as by averaging the quality map values. As discussed in more detail below, OCTA flow data may be determined by identifying contrast differences over time in multiple OCT scans (or acquisitions) of the same tissue (e.g., retinal) region. The present quality map technique may be determined for the individual OCT scans used to define an OCTA flow image, and the quality maps of the individual OCT scans may be averaged to define a quality map for the OCTA flow image they define. Alternatively, or in addition, the present quality map technique may be directly applied to the defined OCTA flow data, or image (which may be based on contrast information, or other flow-indicative data, from multiple OCT scans). Optionally, this directly determined OCTA quality map may also be combined (e.g., a weighted average, e.g., equally weighted or weighted more heavily toward the directly determined OCTA quality map) with the quality maps of the individual OCT scans from which OCTA flow data/image is defined.

Irrespective, the defined quality map (or overall quality measure of an acquisition) may provide an OCT system operator with important information to determine when an acquisition is of low quality and there is a need to retake the scan (e.g., OCT scan or OCTA scan). The present system may further identify one or more possible causes of the low quality and output (e.g., to the system operator or to an automated/sub-automated sub-system of the OCT system) suggestions aimed at obtaining a better-quality scan in a subsequent acquisition. For example, the quality map (or overall measure) may be used in an automated system that determines that another acquisition is needed if the quality map indicates that at least a predefined target retinal region (e.g., a predefined region-of-interest, ROI) within the acquisition is below a predefined threshold quality measure, or if the overall measure of the acquisition is below a predefined threshold overall-quality measure. The automated system may then initiate another acquisition automatically, or in response to an approval input signal from the system operator. The present system may further identify one or more corrective measures (actions) for improving the acquisition quality, and automatically make one or more of the identified corrective measures prior to initiating another acquisition. Alternatively, or in addition, the quality maps (e.g., OCTA quality maps) of multiple acquisitions of the same retinal region may be compared to each other, and the best quality (or higher quality) portions/regions of the multiple acquisitions, as determined from their respective quality maps (e.g., pixel-by-pixel or window-by-window), may be combined to define a composite acquisition of higher overall quality than each of the individual acquisitions (OCT and/or OCTA acquisitions).

A particular embodiment of the invention is applied to an OCTA acquisition at the en face level. The present embodiment generates 2D quantitative maps that describe the quality of the OCTA acquisition (scan) at each en face location. This technique first extracts a set of features related to image texture and other characteristics from a pixel neighborhood in slab visualizations (e.g., en face images) obtained from the OCTA volume. Features are extracted for different pixel neighborhoods and assigned to the neighborhood in a sliding window manner. For example, a window may be of any shape (e.g., rectangular, circular, etc.) and encompass a predefined number of pixels (e.g., 3×3 pixel window). At each window location, features may be determined for a target pixel within the window (e.g., the central pixel) using information from multiple (e.g., all) pixels within the window. Once the features for the target (e.g., central) pixel are determined, the window may be moved one (or more) pixel location(s) and new features determined for another pixel (e.g., the new central pixel) in the new window location. The result is a set of two-dimensional feature maps each describing a different image characteristic at each en face location. These features can be handcrafted (for example: intensity, energy, entropy) or learned as the result of training using a deep learning scheme (or other machine learning or artificial intelligence technique). Examples of machine learning techniques may include artificial neural networks, decision trees, support vector machines, regression analysis, Bayesian networks, etc. In general, machine learning techniques include one or more training stages followed by one or more testing, or application, stages. A more detailed discussion of neural networks, such as may be used with the present invention, is provided below.

In a training stage of one or more of the present machine learning methods, the sets of two-dimensional feature maps obtained from a set of training OCTA acquisitions are combined in a machine learning or deep learning approach to produce a model with outputs corresponding to quality scores previously provided manually by (human) expert graders on the same set of acquisitions. Additionally, the model can also be trained to indicate previously annotated common acquisition problems that can be deduced from the image, such as incorrect focusing, low illumination or light penetration, tracking/motion artifacts, etc.

In a testing or application stage, the learned model from the training stage is applied to sets of two-dimensional feature maps obtained from unseen data (e.g., data not used in the training stage), to produce the 2D quality map(s) as output. The individual quality measures (or a combined quality measure of one or more sub-region (e.g., fractional area/part) of a 2D quality map, such as by averaging individual quality measures within a respective sub-region) may be compared with a predefined, minimum quality threshold to identify regions in the scan that are below a desired quality threshold. Alternatively, or in addition, the values in a 2D quality map(s) can also be averaged across the map(s) to produce an overall quality score. Additionally, if a model was trained to indicate possible acquisition problems in an image, the feature maps can also be used to provide such information in the unseen test image. Below is provided a more detail discussion of different components of this process.

Extraction of Feature Maps

A singular en face image (or slab) or a number N of multiple en face images are generated from an OCTA cube. Each of these en face images is analyzed to produce a set of M feature maps. These feature maps can be designed from known handcrafted image properties (for example, gradient, entropy, or texture) in a given vicinity (e.g., window or pixel neighborhood) of each en face position or be the result of an intermediate layer in a deep learning (or other machine learning) scheme, as discussed above. The result is a set of N×M feature maps for each OCTA acquisition.

For each handcrafted image property (or abstract property from a deep learning scheme) and generated slab, a singular map from the set with the same size as the slab is generated considering a sliding window manner approach, where the vicinity of each pixel is considered to generate a unique property value (e.g., texture value, such as one or more Haralick features). Such a property value is assigned to the pixel vicinity in the map. As the sliding window moves, being centered at different pixel locations in the slab, the resulting value in each vicinity gets averaged considering the values computed for the vicinity. The vicinity can be defined in different manners depending on the application, such as a rectangular or circular neighborhood. In a similar manner, the extent of the neighborhood and overlap in the sliding window approach can be defined depending on the application. For example, FIG. 1 illustrates a set of twenty-two Haralick features H1 to H22 extracted in a circular vicinity of 250 microns with a pixel-by-pixel sliding window 11 from a retina flow slab 13, as indicated by arrow 15. Haralick features, or Haralick texture features, are a well-known mathematical method of extracting texture features from a matrix or image region. A more detailed discussion of Haralick features may be found in "Statistical and structural approaches to texture," Proc. IEEE, vol. 67, no. 5, pp. 786-804, 1979, by Robert M. Haralick, herein incorporated in its entirety by reference.

Training Stage

Figure 2:
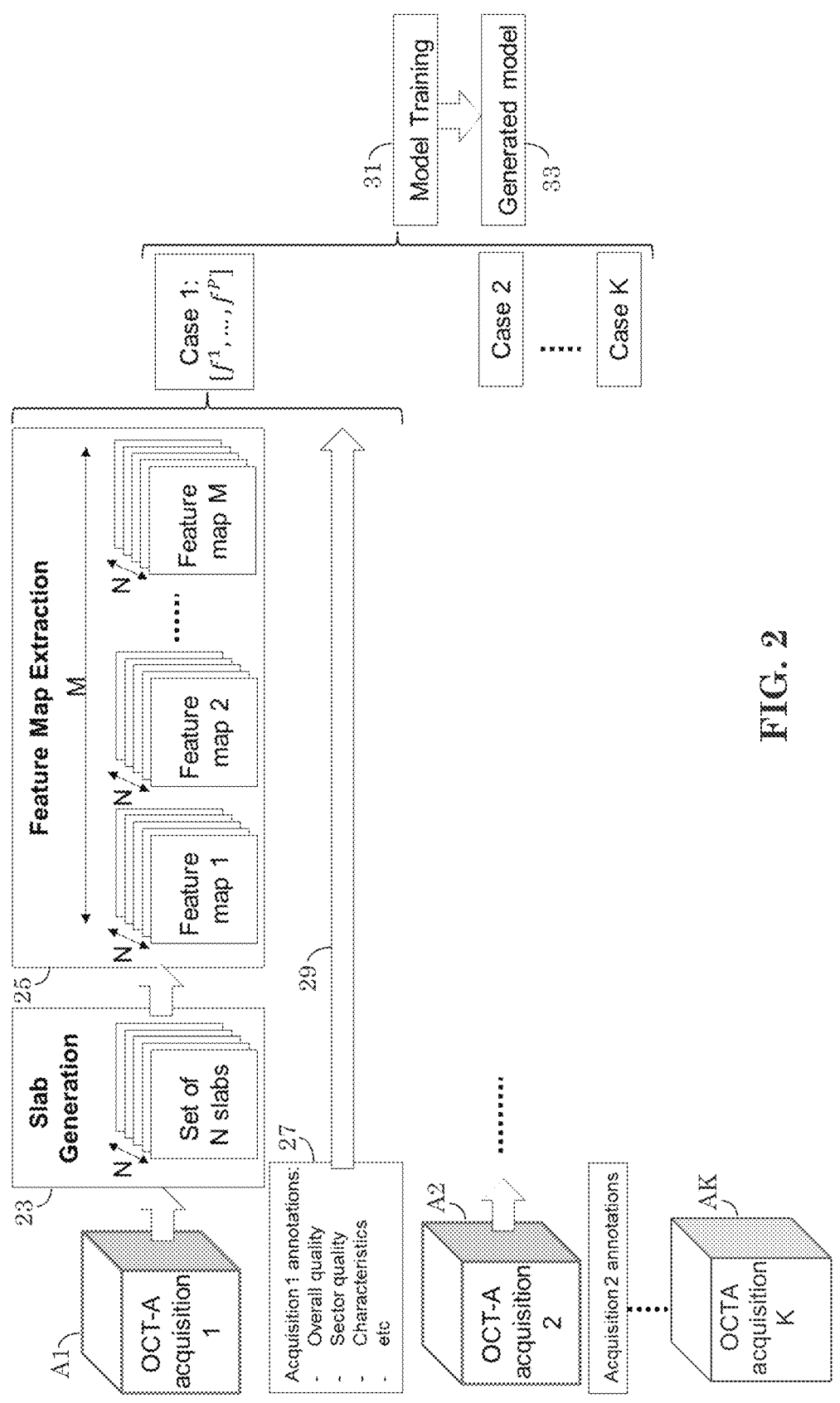
FIG. 2 provides a representation of an exemplary training scheme workflow in accord with the present invention.

FIG. 2 provides a representation of an exemplary training scheme workflow in accord with the present invention. The present example shows K training OCTA acquisition (scan) samples A1 to AK. For each acquisition, N slabs (e.g., en face images) 23 may be generated, and M feature maps 25 (e.g., Haralick Features as illustrated in FIG. 1) may be defined for each of the N slabs 23. The present example may be trained using an overall-score approach wherein an OCTA acquisition is given a single, overall (e.g., quality) score value, and/or may be trained using a region-based score approach wherein an OCTA acquisition is divided into multiple regions (e.g., P different regions) and each region is given a respective (e.g., quality) score. How training vectors are defined may depend on whether an overall-score approach or region-based score approach is used. Irrespective, for discussion purposes, the training vector(s) for each OCTA acquisition is herein termed a "case." Consequently, FIG. 2 shows K cases (e.g., Case 1 to Case K), one per OCTA acquisition A1 to AK. Optionally, additional labeling 27 (e.g., overall quality, sector quality, image or physiological or other identifying characteristics, etc.) may be combined with the feature maps to define the corresponding case, as indicated by arrow 29. Case 1 to Case K may then be submitted to a model training module 31 that outputs the generated model 33.

In summary, training can be done with overall quality scores and/or information scores given to the entirety of an OCTA scan and/or region-based scores given to particular regions of an OCTA scan. For example, if overall scores are provided (e.g., per OCTA acquisition), the average value (or any other aggregating function) of each feature map can be used to provide respective single value. In this case, from a single OCTA acquisition (e.g., A1), one may generate a single N×M feature vector for use in training (e.g., training input), and the provided overall value as a training outcome (e.g., the training target output). Alternatively, if region-based scores are provided for each acquisition, the average value (or any other aggregating function) of each feature map (e.g., by region) can be used for training, producing multiple training instances. In this case, if an OCTA acquisition/scan is graded in P different regions, this would account for a P number of N×M feature vectors [$f^1$ to $f^P$] with which to train, and P corresponding values as training outcomes (e.g., the training target outputs). This approach is flexible for different labeling for the training stage, even for the case of training with overall scores for the entirety of each acquisition. This accelerates the collection of training data since images can be graded with an overall score.

Adjustment of Predicted Scores by Higher Degree Polynomial

Depending on the model and data used to train the algorithm for use in accord with the present invention, an additional adjustment may be applied to the produced quality scores. For example, using a linear model to describe quality based on the combination of features with a fitted weight (like linear regression) may not properly follow the subjective manner scores, and may need adjusting. That is, there is no guarantee the quantitative difference between a score of 1 and 2 is the same as the difference between a score of 2 and 3. Additionally, using training data where some particular scores are more represented than others may result in an unbalanced model, which may produce better results adjusted to a given score while having a larger error for others. One way to mitigate this behavior is by adding an additional adjustment or fitting of the predicted scores by the model to the given target scores using a higher degree polynomial than the one initially considered/used to train the model. For example, when using a linear model to train the algorithm, one can consider a second-degree polynomial to adjust the predicted scores to better represent the target data. An example of such an adjustment (e.g., as applied to a linear model) is provided below.

Application Stage

FIG. 3 provides a representation of an exemplary application (or test) stage workflow in accord with the present invention. In a manner similar to that of the training stage of FIG. 2, in the application stage, the corresponding slabs 41 and feature maps 43 are extracted from a sample OCTA acquisition 45 not previously seen/used in the training stage. As indicated by block 47, the generated model 33 obtained from the training stage (shown FIG. 2) may be applied to a given pixel vicinity of the feature maps 43 in a sliding window manner, generating outcome values for each pixel vicinity. As the sliding window moves, being centered at different pixel locations of the feature maps, the resulting outcome value in each vicinity gets averaged considering the values computed for the vicinity. The result is a map, such as a quality map 49 indicating angiography quality (or any other property or information the model was designed to characterize), for each en face location of the OCTA acquisition 45. The values in the resulting map 49 can also be aggregated (for example, by averaging) to provide an overall value (e.g., quality score value) for the acquisition 45.

Post-Processing

When using textural vicinity to predict the quality of a single pixel in a resulting quality map of W×H (width× height) dimensions, a total of W×H vicinities need to be evaluated to generate the complete map. This process can be applied in a sliding window manner, but it may take a longer time than optimal/desired to slide the window pixel-by-pixel, since the feature extraction process and model predictions can be computationally expensive. To accelerate this process, one may define the sliding window to have a given overlap in the vicinities considered and average values in the overlapping vicinities. While a lower overlap between vicinities is desirable for faster computation, this can result in pixelated images with abrupt transitions when the overlap is too low. In order to correct this, Gaussian filtering of the generated quality maps may be used/applied. This Gaussian filtering may be adapted to the defined vicinity size and overlap ratio between vicinities to produce visually pleasing results with minimum image corruption, as larger vicinities with lower overlap ratios may need a more aggressive filtering. Exemplary filtering parameters may be defined in the following manner:

$$[\sigma_x, \sigma_y] = [2 \cdot (RadFeatPix_x/3) \cdot (1 - overlapR_x), 2 \cdot (RadFeatPix_y/3) \cdot (1 - overlapR_y)]$$

$$[Filter\_radius_x, Filter\_radius_y] = [(2 \cdot RadFeatPix_x) + 1, (2 \cdot RadFeatPix_y) + 1],$$

where $\sigma_x$ and $\sigma_y$ are the sigma parameters for the Gaussian filtering; Filter_radius$_x$ and Filter_radius$_y$ are the filter radius (extent) of the filtering function; RadFeatPix$_x$ and RadFeat-Pix$_y$ are the neighborhood (or window) size in pixels for the vicinity in the horizontal and vertical directions, respectively; and overlapR$_x$ and overlapR$_y$ are the defined overlap ratios in the horizontal and vertical directions, respectively.

FIG. 4 illustrates the effect of reducing the overlap ratio, such as to increase computational speed, and the application of the present Gaussian filtering. Box B1 provides both color quality map and/or grayscale quality map results for a given input image prior to filtering for overlap ratio examples spanning from 95% overlap down to 50% overlap. Box B2 provides color maps and/or grayscale maps of the same quality maps after applying Gaussian filtering. As can be seen, decreasing the overlap ratio produces a more pixelated and abrupt behavior between vicinities in the images prior to filtering, but this effect can be reduced with application of appropriate filtering while still producing results substantially similar to higher overlap ratios employed. For example, after filtering, there is little difference between the quality maps with 50% overlap and those with 85% or 95% overlap.

FIG. 4 further shows that one of the limitations of the sliding window approach is that not all the image border locations will be evaluated when using a circular neighborhood, since not all of the circular neighborhoods will be able to allocate a neighborhood with a given radius and overlap ratio. This problem may be more evident when applying the Gaussian filtering, as regions without information (e.g., "not-a-number", or "NaN") cannot be included in the filtering process. This effect may be eliminated by applying the Gaussian filtering so that it ignores NaN pixels with an appropriate weighting, and/or extrapolating to produce a value in such NaN pixels. This may be accomplished by the following steps:

1) Define a map of the same size as the quality map with all pixels of value 1: Img1
    2) Replace all the NaN locations in the unfiltered quality map and in Img1 with the value 0
    3) Apply the Gaussian filtering to Img1
    4) Apply the Gaussian fileting to the unfiltered quality map
    5) Divide the result of step 4 by the result of step 3

Figures 5, 10A, 10B:
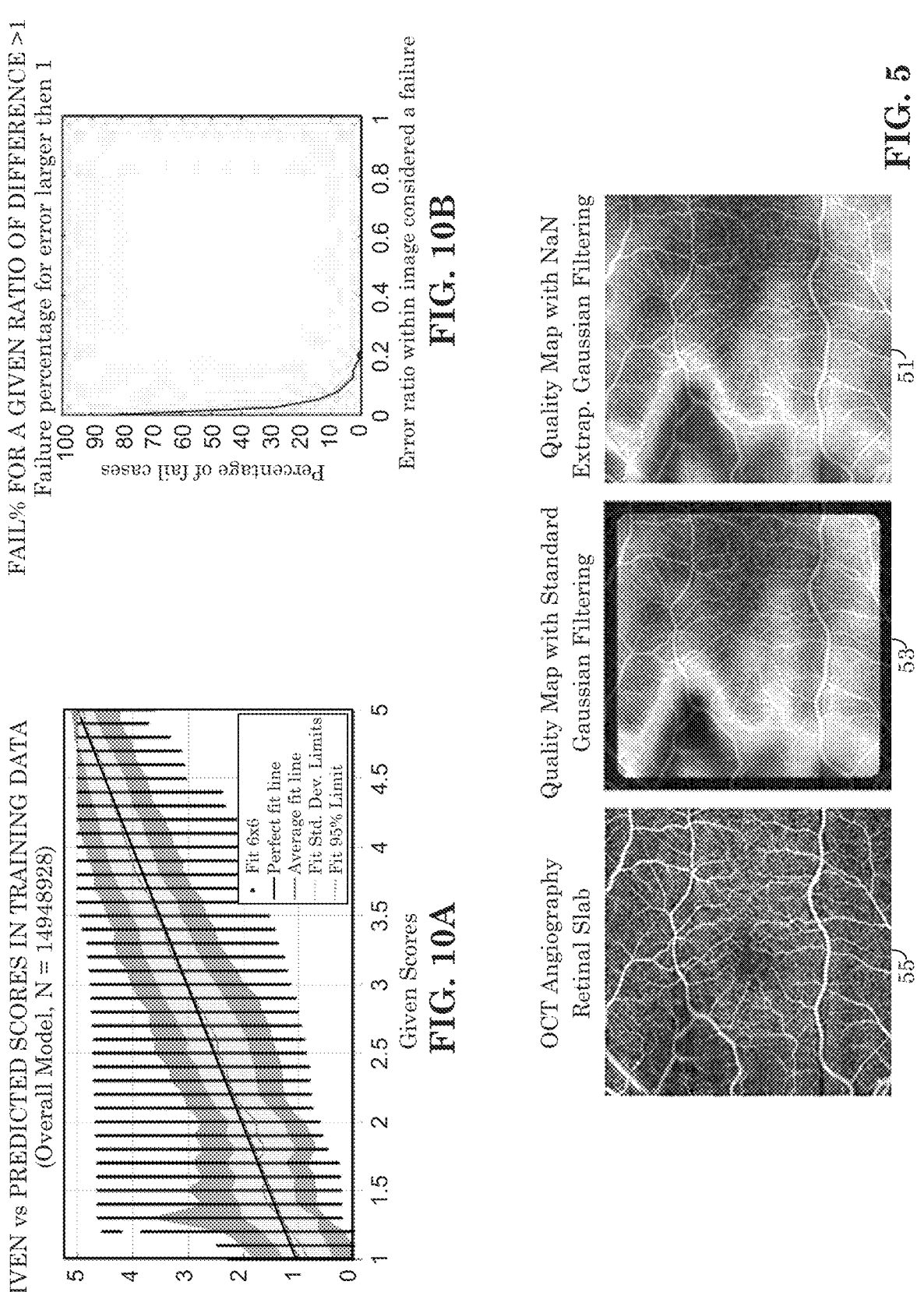
FIG. 5 provides an exemplary result of applying extrapolation to fill-in not-a-number (NaN) values in accord with the present invention to a quality map having standard filtering (e.g., fill-in NaN values along the perimeter of the quality map), where the quality map is obtained from a retina angiography slab (e.g., an en face image).
FIG. 10A displays an analysis of average grader score values versus predicted values for all pixels of all images in a training set, where the horizontal axis indicates the average given score by the expert graders and the vertical axis represents the predicted scores by the trained model.
FIG. 10B provides a percentage of failure cases as the threshold of what is considered a failure is varied for the images in the training set, where failure is defined as a given ratio (e.g., percentage or fraction) of the image that has a deviation higher than 1 quality point from the ground truth.

For comparison purposes, FIG. 5 provides an exemplary result 51 (e.g., in color or grayscale) of applying the above extrapolation of NaN values to a quality map having standard filtering 53 (e.g., in color or grayscale) obtained from a retina angiography slab (en face image) 55. The result of this operation is a filtered map 51 (e.g., in color or grayscale) with correctly extrapolated values in NaN locations.

Training Scheme

An example for training and testing a model to characterize subjective angiography quality in retina flow OCTA slabs is herein provided. The model was trained on retina flow slabs collected from a plurality of acquisitions (e.g., 72 or 250 OCTA scans, where each scan was a 6×6 mm OCTA scan).

Collected Annotations

A group of (e.g., human) graders independently grade each acquisition at each pixel location in the en face slab, e.g., using a numeric grading scale. For example, each graders may outline different regions within each slab according to each region's respective quality using the grading scale. The numeric grading scale may consist of quality values ranging from 1 to 5, where 1 may indicate the worst quality (unusable data) and 5 may indicate the best quality (optimal). FIGS. 6A to 6E illustrate various exemplary guidelines for (or example of) grading the quality of flow images using a 1-5 grade scale. The manual grade outputs may also be used to define one or more weights of the Haralick coefficients in the flow quality algorithm.

FIG. 6A is a first example of general quality grading using a 1-5 quality grade scale to assign individual quality grades to different regions of an en face flow image 61. For ease of illustration, each region is identified by its grade value and a corresponding color-coded or line pattern or brightness intensity perimeter. For example, a blue or solid black line perimeter corresponds to a grade 1, a red or solid gray line perimeter corresponds to a grade 2, a green or long dash line perimeter corresponds to grade 3, a lavender or short dash line perimeter corresponds to grade 4, and a yellow or dotted line perimeter corresponds to a grade 5. In the present example, grade 5 (yellow/dotted perimeter region) identifies an image region of highest quality with excellent brightness and contrast, as determined by the (e.g., human) expert grader. Regions of grade 5 show excellent brightness and/or contrast, the capillaries are very well delineated, and the grader can follow the capillaries. In the grader's estimation, regions of grade 5 are examples of the best image quality achievable. Grade 4 (lavender/short-dash-line regions) identify image regions of reduced brightness and/or contrast (as compared to grade 5 regions), but the grader can still follow the capillaries very well. Grade 3 (green/long-dash-line regions) are of lower quality than grade 4, but the grader can still infer (or guess) the presence of capillaries, with some discontinuities. Therefore, within regions of grade 3, a grader might miss some capillaries. Regions of grade 2 (red/solid-gray regions) are of lower quality than grade 3, and define regions where a grader can see some signal between large vessels, but capillaries are not resolved. Within regions of grade 2, some area between capillaries could falsely appear as ischemic. In regions of grade 1 (blue/solid-black regions) the content is washed out, and the grader deems these regions to be unusable.

FIG. 6B provides a second example with elements similar to those of FIG. 6A having similar reference characters and defined above. FIG. 6B illustrates the effects of artifacts, such as due to floaters, on image quality. In the present example, floaters are identified by noting that such artifacts are not present in other scans of the same region.

Figure 6E:
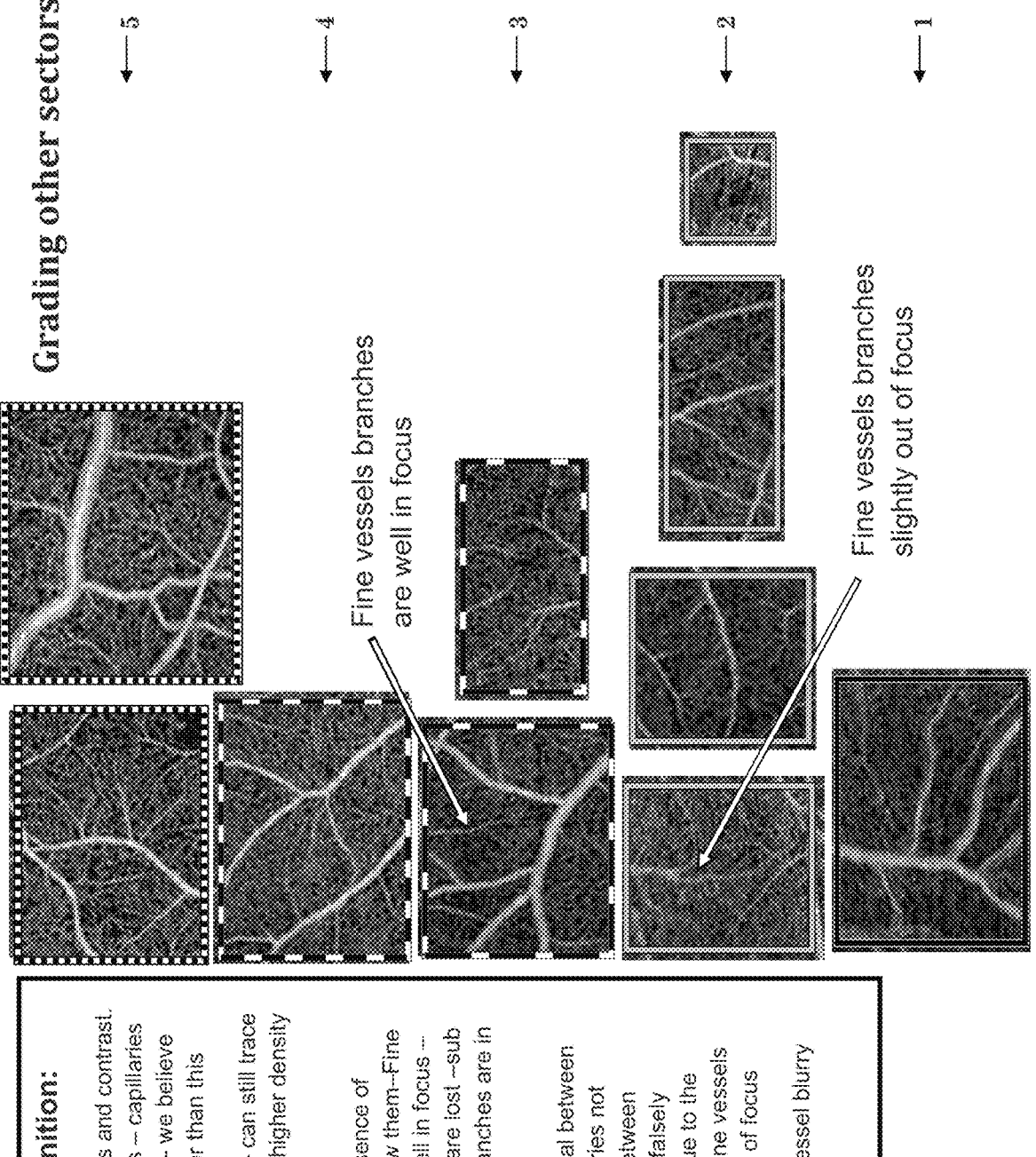

In order to provide more accurate annotations that can be used to train the algorithm, specific regions of the retina slab may need to have specific annotation instructions. For example, since the fovea region is typically avascular, judging the visibility of capillaries can be more difficult. Below is an example of dividing a en face flow image into three regions of interest separately considered for defining grading criteria to account for the difference in vascularization characteristics. FIG. 6C illustrates the use of the foveal avascular zone (FAZ) for grading, FIG. 6D illustrates the use of the nasal sector for grading, and FIG. 6E illustrates the use of the rest of the image for grading.

In FIG. 6C, a grade of 5 again indicates the best image quality with excellent brightness and/or contrast. Within these regions, a grader can follow the contour of the FAZ with no difficulty or hesitation. Regions of grade 4 are of reduced brightness and/or contrast, but the grader can still trace the FAZ. In regions of grade 3, capillaries are in focus and a grader can follow the contour of the FAZ with some obvious discontinuities. Within this region, one could miss capillaries. In regions of grade 2, poor signal obstructs some part of the FAZ, and some capillaries appear out of focus. As before, grade 1 regions are unusable, and at least some part of the FAZ content is washed out.

In the example the grading nasal sectors of FIG. 6D, a grade of 5 indicates best image quality with excellent brightness and/or contrast. In regions of grade 5, the retinal nerve fiber layer (RNFL) is very well delineated, such that the grader can follow the RNFL without difficulty. Regions of grade 4 have reduced contrast, but the RNFL pattern can still be recognized. In regions of grade 3, the grader can infer (guess) the presence of RNFL, albeit with some disconti- nuities. Within this region, a grader can deduce there are RNFL capillaries, but may have difficulty tracing individual capillaries. Grade 2 indicates regions where a grader may see some signal between large vessels, but the RNFL cannot be resolved. Within regions of grade 2, some area might appear falsely ischemic. Regions of grade 1 are deemed unusable. Within grade 1 regions, medium vessels may appear blurry, and content generally appears washed out.

In FIG. 6E, grade 5 indicates regions of best quality with excellent brightness and/or contrast, with very well delin- eated capillaries that can be followed easily. Grade 4 are regions of reduced contrast where the capillaries can still be traced, and have higher density visible as compared to grade 3, which are regions where one can guess the presence of capillaries but cannot follow them. Nonetheless in grade 3, fine vessels branches are well in focus (sub arteriole and venules branches are in focus), but details of the capillaries are lost. Grade 2 identify regions where some signal between large vessels can still be seen, but capillaries not resolved. Within grade 2 regions, fine vessels could appear slightly out of focus, and some area between capillaries could appear falsely ischemic (for example, due to the presence of float- ers). Grade 1 indicates unusable regions, typically with large vessels appearing blurry and content being washed out.

Using the above grading examples, grader annotations may be collected using, for example, a free-hand drawing tool, such as an ImageJ Plug-in, as is known in the art. Graders may draw and label regions of a slab according to a region's quality using any shape, with the goal of covering the entire slab field-of-view with annotated regions. The collected annotations from the different graders may be averaged to generate average manual quality maps that may be used as target outcome when training the quality map model.

Figure 6F:
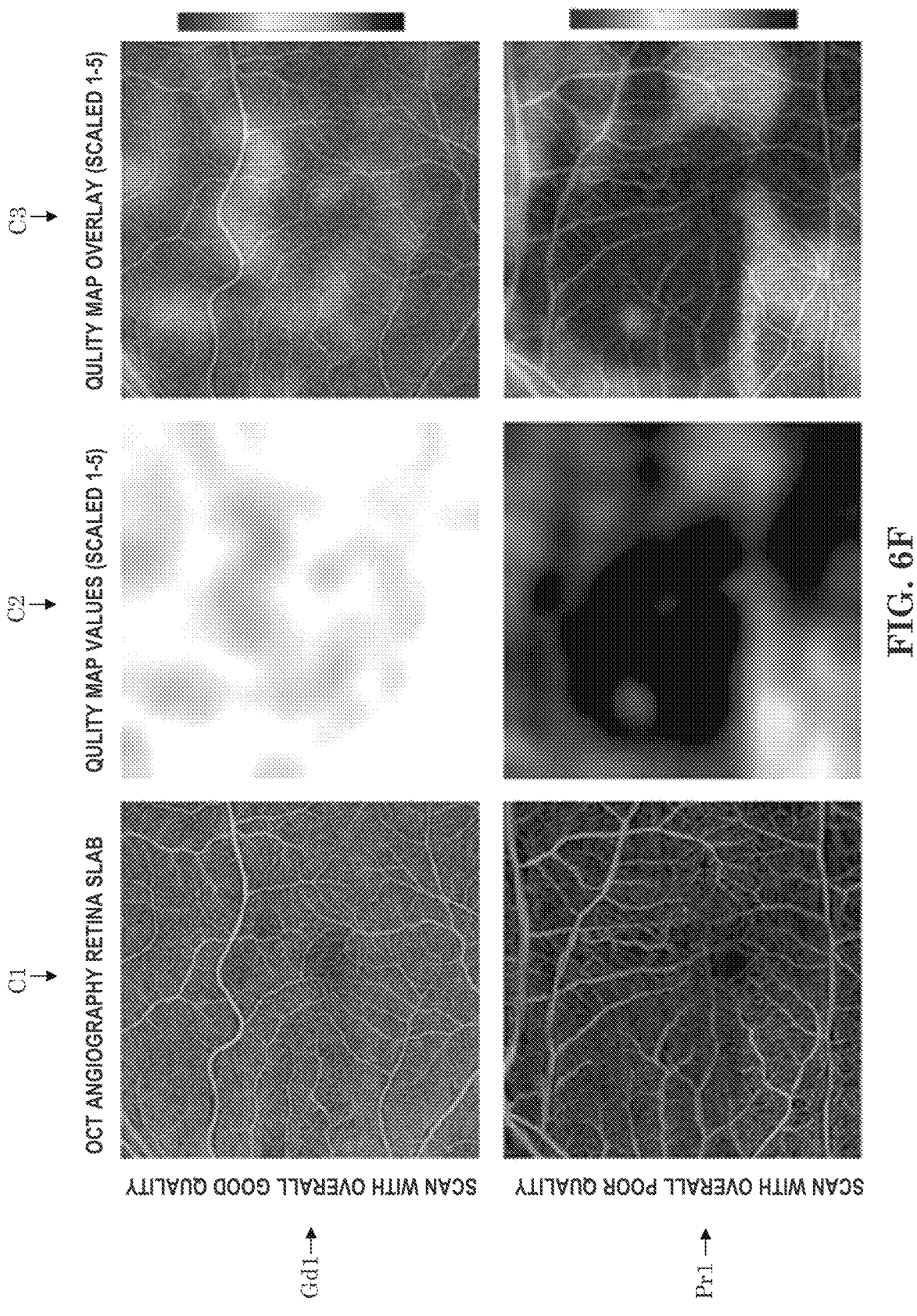
FIG. 6F shows a first example of results from a scan of overall good quality (top row, Gd1) and a second example of results from a scan of overall poor quality (bottom row, Pr1).

FIG. 6F shows a first example of results from a scan of overall good quality (top row, Gd1) and a second example of results from a scan of overall poor quality (bottom row, Pr1). The left-most images (e.g., images of column C1) are individual 6×6 angiography retina slabs; the center images (e.g., images of column C2) are quality map values scaled from 1 to 5 (in grayscale); and the right-most images (e.g., images of column C3) show quality map overlays on retina slabs (e.g., C1) with a color-coded scale or grayscale-coded scale from 1 to 5, as shown. The present exemplary method assesses a set of texture properties of the OCTA data in the vicinity of each en face location (e.g., pixel or window/ region) and assigns a quantitative score that correlates with a scan quality at such location. The result is a two-dimen- sional quality map that describes the quality of the scan at each en face location. This map can be used to judge the quality of an individual scan across its FOV, to quantify the difference in quality among several acquisitions of the same subject at each en face location or to provide an overall quality metric for each acquisition by averaging the map values. In addition, these quality maps can also provide the OCT/OCTA operator with important information about the need to retake a scan due to poor quality and/or suggestions aimed at obtaining a better-quality scan in a subsequent acquisition. Other possible applications of this algorithm include a measurement of reliability for other algorithms applied to OCTA (or OCT) data, automated exclusion of low-quality regions of an OCTA scan from quantification made by different algorithms and their use as relative weights to collage, and average or montage OCTA slabs or OCTA volumes from multiple acquisitions in overlapping en face locations according to their quality.

Extracted Features Considered

Figures 7, 9:
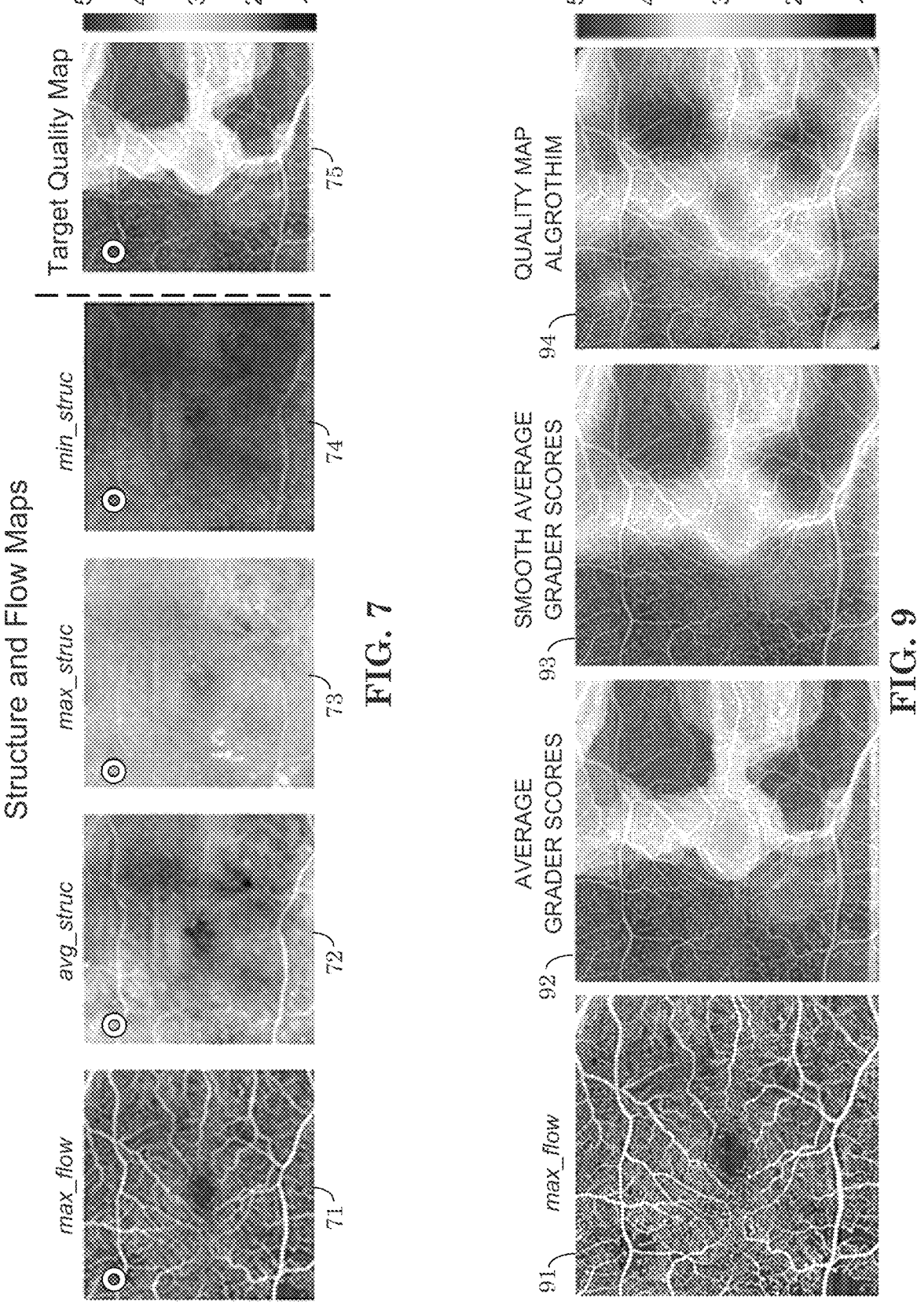
FIG. 7 provides an example of the four slabs 71-74 used for feature extraction (max_flow, avg_struc, max_struc, and min_stuc, respectively) along with a marking of a considered neighborhood (white circle), and the resultant target quality map 75.
FIG. 9 illustrates the effect of smoothing the average grader maps when considered as ground truth.

For each OCTA scan considered for training, the retina slab definition may be used to generate four different slab images: An en face flow slab generated by averaging the five highest-valued pixels at each A-scan location (max_flow); an en face structure slab generated by averaging the values at each A-scan location (avg_struc); an en face structure slab generated by generated by averaging the five highest-valued pixels at each A-scan location (max_struc); and an en face structure slab generated by averaging the five lowest-valued pixels at each A-scan location (min_struc). Optionally, when generating these en face projections no further processing or resizing is considered. For each for the four slab images, a set of 22 Haralick features indicating texture properties may be extracted considering circular neighborhoods of a 250- microns radius circular sliding window with a given offset, such as a pixel-by-pixel offsets or a 75% (i.e., 0.75) overlap. If for example, 72 images are graded, this would account for 88 features extracted from 133,128 different neighborhoods used in the training process. FIG. 7 provides an example of the four slabs 71, 72, 73, and 74 used for feature extraction (max, ow, avg_struc, max_struc, and min_stuc, respectively) along with a marking of a considered neighborhood (white circle) where eighty-eight features are extracted (22 per image). The resultant target quality map 75 (e.g., in color or grayscale) is also shown.

It may be noted that Haralick features extracted from the images can be highly dependent on the particularities of a specific instrument and software version, like the baseline signal level, internal normalization, or possible internal data filtering. For example, in a proof-of-concept implementation of the present invention, the scans used for training went through an internal process of 3D Gaussian filtering of the collected flow volume. In order to apply this algorithm in subsequent software versions that did not support this inter- nal Gaussian filtering, the same type of filtering needed to be applied beforehand. That is, flow volumes form scans acquired using an instrument that did not include internal Gaussian filtering were pre-filtered by the algorithm before feature extraction.

Training Model

In one example, Lasso regression (a generalized liner regression model) was used to train the average values of the computed feature maps to predict the overall quality score of the acquisitions. For example, Lasso regression was used to train a set of 88 features extracted from the 133128 neigh- borhoods to predict the manual quality grading given to the center pixel of the corresponding neighborhoods in the target quality map, as illustrated in FIG. 7. The Lasso model was trained to choose the regularization coefficients (e.g., Lambda) that would produce the lowest mean squared error in the predictions. A more detailed discussion of Lasso regression may be found in "Regression Shrinkage and Selection via the lasso," Journal of the Royal Statistical Society, Series B (methodological), Wiley, 1996, 58 (1): 267-88, by Robert Tibshirani, herein incorporated in its entirety by reference. The resulting model could be applied in different acquisitions in a sliding window manner (defined for the feature extraction) to produce angiography quality maps.

Figure 8B:
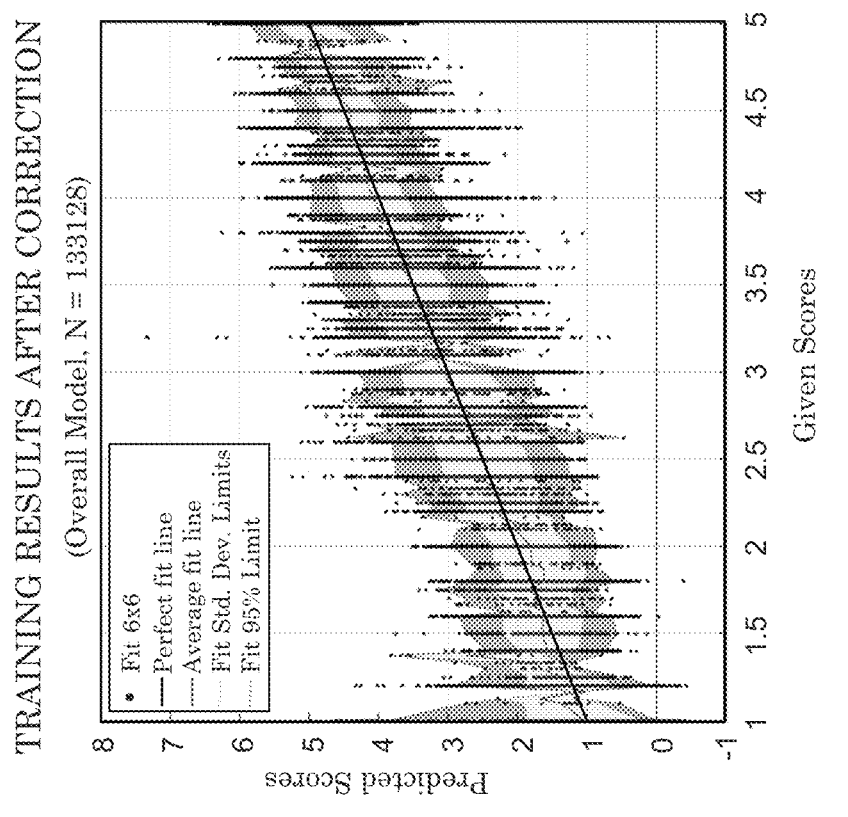
FIG. 8B provides the results after applying the 2nd degree polynomial adjustment/correction.
Figure 8A:
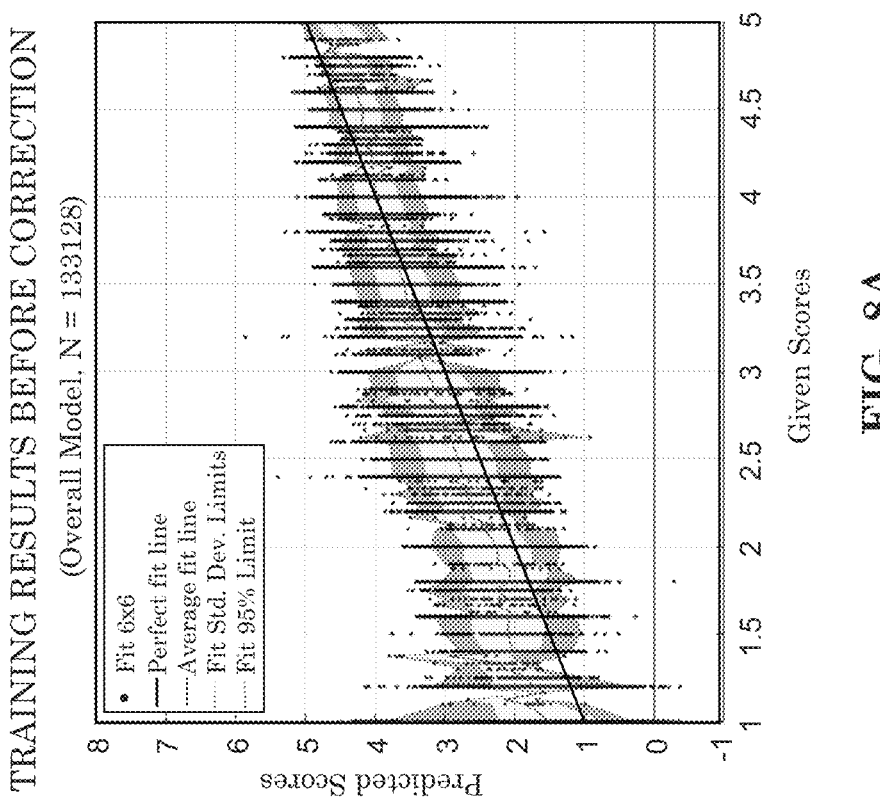
FIG. 8A provides a graph of the results of predicted values in the training data before applying an adjustment (correction) by use of a 2nd degree polynomial.

As discussed above in section "Adjustment of Predicted Scores by Higher Degree Polynomial," since a linear model is used in the present example, and not the same amount of data is considered for all 1-5 gradings, an additional 2nd-degree polynomial was used to adjust the results of the training. For comparison purposes, FIG. 8A provides a graph of the results of the predicted values in the training data before this adjustment (correction), and FIG. 8B provides the results after applying the 2nd degree polynomial (after adjustment/correction). In both graphs, the horizontal axis indicates the given score (e.g., aggregated from manually assigned scores by experts) in the target quality map for each training neighborhood and the vertical axis represent the predicted scores by the trained model. Also in both graphs, the light gray shaded area represents the standard deviation, and the dark gray shaded area represents the 95% limits of the predicted scores for a given target score. From these two graphs, one can observe how the average prediction for each given score is closer to the given score after applying the present adjustment and the confidence intervals of the prediction are also more stable across different given scores.

Results

In order to evaluate the accuracy of the algorithm, the quality maps resulting from the automated algorithm were compared to ground truth quality maps. Ground truth quality maps were constructed from the manual regional gradings averaged across different graders as explained above (see section "Collected Annotations"). Since the average grader maps can present sharp transitions due to the regional annotation process and the automated quality maps present a smooth behavior due to the moving window analysis of the different regions and smooth post processing, the average grader maps were smoothed to provide a fair comparison. This smoothing was considered as the expected behavior of the automated algorithm, using a smoothing filter with a kernel equal to the extent of the region used in the moving window processing of the automated algorithm (in this case, a circular neighborhood of 250 microns radius).

FIG. 9 illustrates the effect of smoothing the average grader maps when considered as ground truth. For illustration purposes, a max_flow image of an OCTA retina slab 91, the average of the manual grader scores 92 of the max_flow image, the smoothed average grader map 93 (treated as ground truth), and the result of the present algorithm 94 (e.g., in color or grayscale) are shown.

The evaluation was done in two steps: (1) First analyzing the behavior on the same data used to train the algorithm to understand the best expected behavior; and (2) then analyzing the behavior in a separate test image set.

Expected Results—Analysis from Training Data

While analyzing the perdition accuracy in the same data as used for training is typically not indicative of expected results in independent test data, in the present example, a linear model is employed to fit a very large number of instances with a much smaller number of extracted features as predictors, so overfitting is extremely unlikely, and the result gives a good indication of what to expect in independent test data. The results obtained in the training data were analyzed to understand the best expected behavior of the algorithm and set the limits of what could be considered a good result and a not optimal result.

Returning to FIG. 9, which shows example results obtained in one of the cases used to train the algorithm, one can observe how, and to what degree, the automated results 94 from the algorithm resemble those collected in the smooth average grader scores 93 (used as ground truth). Upon review of the results in the training cases, all provided "acceptable" results from a subjective point of view.

In order to understand how closely the results from the algorithm resemble the ground truth in the training data, the values predicted by the algorithm in all pixels from all cases (a total of 14,948,928 data points) in the training set were compared to those in the ground truth. FIG. 10A displays an analysis of average grader score values versus predicted values for all pixels of all images in the training set, where the horizontal axis indicates the average given score by the expert graders and the vertical axis represents the predicted scores by the trained model. The light gray shading area and dark gray shading area represent the standard deviation and the 95% limits of the predicted scores for a given target score, respectively. One can observe how on-average the predicted scores resemble average grader scores. There are large tails due to outliers for the predicted scores, but the standard deviation and 95% limits of the differences mostly fall under 0.5 and 1.0 point of assigned quality across different quality levels.

The results on the training data were used to establish what can constitute optimal and sub-optimal results that could eventually help determine pass and fail ratios when establishing algorithm requirements. In order to do so, one can established what would be the percentage of failure cases as one varies the threshold of what one considers a failure, with failure defined as a given ratio (or percentage) of the image having a deviation higher than 1 quality point from the ground truth, as illustrated in FIG. 10B. That is, FIG. 10B provides a percentage of failure cases as the threshold of what is considered a failure is varied for the images in the training set, where failure is defined as a given ratio (e.g., percentage or fraction) of the image that has a deviation higher than 1 quality point from the ground truth. As one considers a smaller portion (e.g., fraction or percentage) of the image with a deviation larger than 1 to be a failure, one expects to see a larger percentage of fail cases, as it would be a more restrictive requirement. It is was observed that the present algorithm produced no failures in the training data when setting the ratio threshold is set to 0.2. That is, by setting the requirement for an acceptable result to be that no more than 20% of the image can have deviations larger than 1 quality point from the ground truth, all the results would be acceptable in the training set images. This analysis was used to further evaluate results in the independent test data.

5.2 Results in Independent Test Data

As part of the proof-of-concept implementation, twenty-six 6×6 mm OCTA scans of eyes different from those used in a training set were analyzed as independent test data. As indicated above in section "Extracted Features Considered," flow volumes from scans acquired using an instrument version that did not include internal Gaussian filtering were pre-filtered by the algorithm before feature extraction. The retina OCTA flow slab for each scan was manually labeled independently by three different expert graders at each pixel location in the en face slab following the same approach as for the training data, as discussed above in section "Collected Annotations."

Figures 11, 12A, 12B:
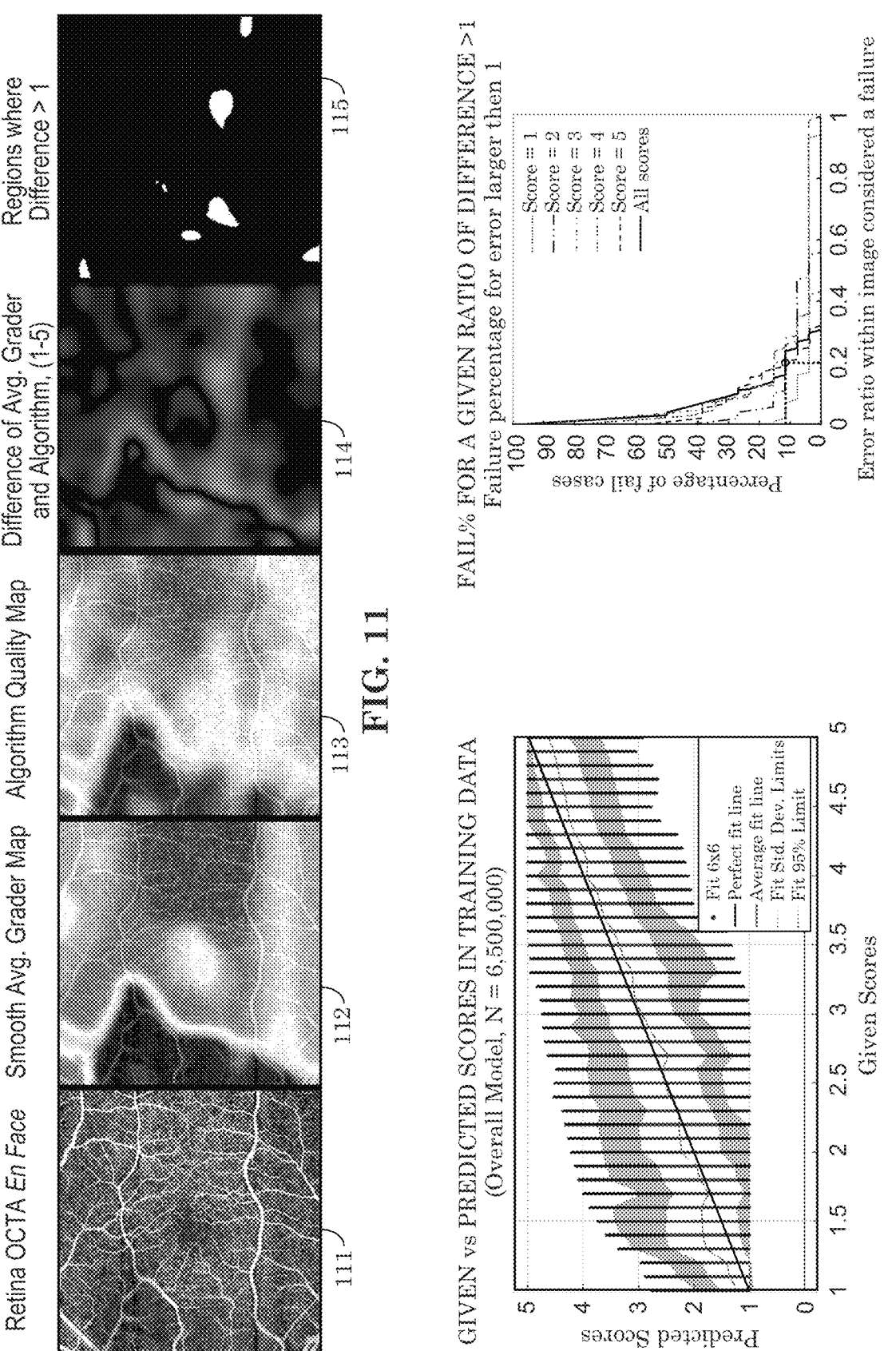
FIG. 11 displays example results comparing a retina slab 111, collected ground truth quality scores from three expert graders 112, the quality grading results of the present algorithm 113, the differences between the ground truth and the algorithm quality map 114 scaled in a 0-5 grayscale, and the regions where the deviation from the ground truth and algorithm quality map is larger than 1.0 quality score 115.
FIG. 12A is a graph of the average grader score values versus predicted values of all 6,500,000 data points in the test set.
FIG. 12B displays the percentage of failure cases encountered as the threshold of what is considered a failure for the images in the training set was varied, with failure defined as a given ratio (e.g., percentage or fraction) of the image that has a computed quality measure deviation higher than 1 quality point from the ground truth.

FIG. 11 displays example results (e.g., in color or grayscale) comparing a retina slab ("Retina OCTA En Face," 111), collected ground truth quality scores from three expert graders ("Smooth Avg. Grader Map," 112), the quality grading results of the present algorithm ("Algorithm Quality Map," 113), the differences between the ground truth and the algorithm quality map ("Diff. of Grader and Algorithm," 114) scaled in a 0-5 grayscale, and the regions where the deviation from the ground truth and algorithm quality map is larger than 1.0 quality score ("Regions where Difference>1," 115). It can be observed that for this particular example, the results of the algorithm resembles those collected from expert graders, on average, and also resembles the quality of the retina slab, with an obvious region of lower quality at the left of the image. One can also see how this case would be considered acceptable by the algorithm standards set earlier by analyzing the training data: e.g., the extent of deviation larger than 1.0 between the algorithm and ground truth is less than 20% of the image.

Similarly, the values predicted by the algorithm in all pixels from all cases (a total of 6,500,000 data points) in the test set were compared to those in the ground truth. FIG. 12A is a graph of the average grader score values versus predicted values of all 6,500,00 data points in the test set. The graph indicates that on average the predicted scores resemble those given by an average grader. The tails observed were smaller than for the training set, but the standard deviation (e.g., the light gray area on the graph) and 95% limits (the dark gray area of the graph) of the differences seem slightly larger than for the training set. This may be due to the data used to train the algorithm providing a better fit, and the use of only 3 graders in the test set ground truth, which could account for less reliability. FIG. 12B displays the percentage of failure cases encountered as the threshold of what is considered a failure for the images in the training set was varied, with failure defined as a given ratio (e.g., percentage or fraction) of the image that has a computed quality measure deviation higher than 1 quality point from the ground truth. Using a requirement for an acceptable result to be that no more than 20% of an image having a deviation of quality measure from the ground truth larger than 1 (as established by the training data), 23 out of the 26 images would be acceptable, which constitutes 88% of the images having acceptable results.

Figure 13A:
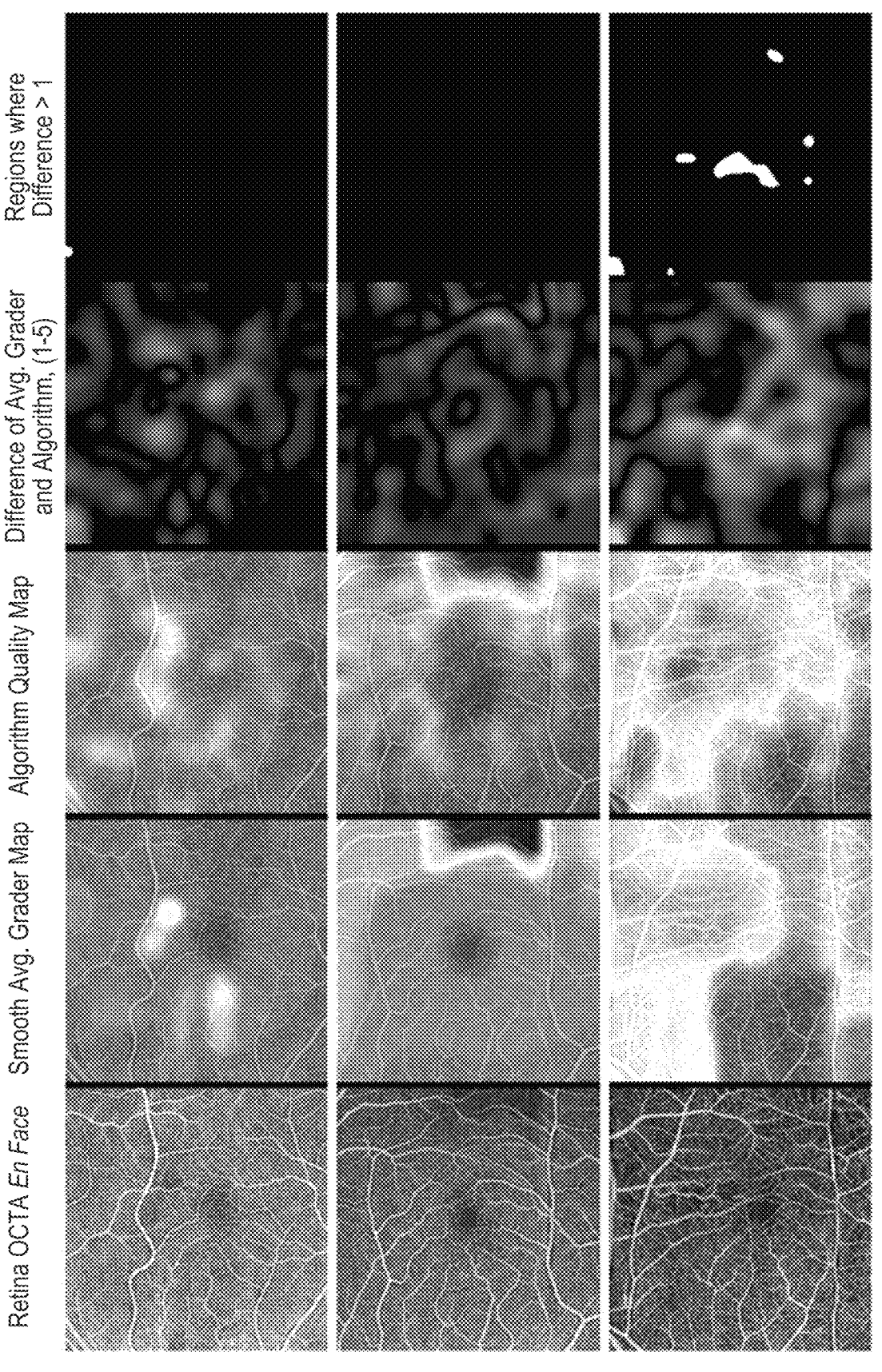
FIG. 13A shows example results of three images deemed acceptable given this 20% deviation limit for passing.
Figure 13B:
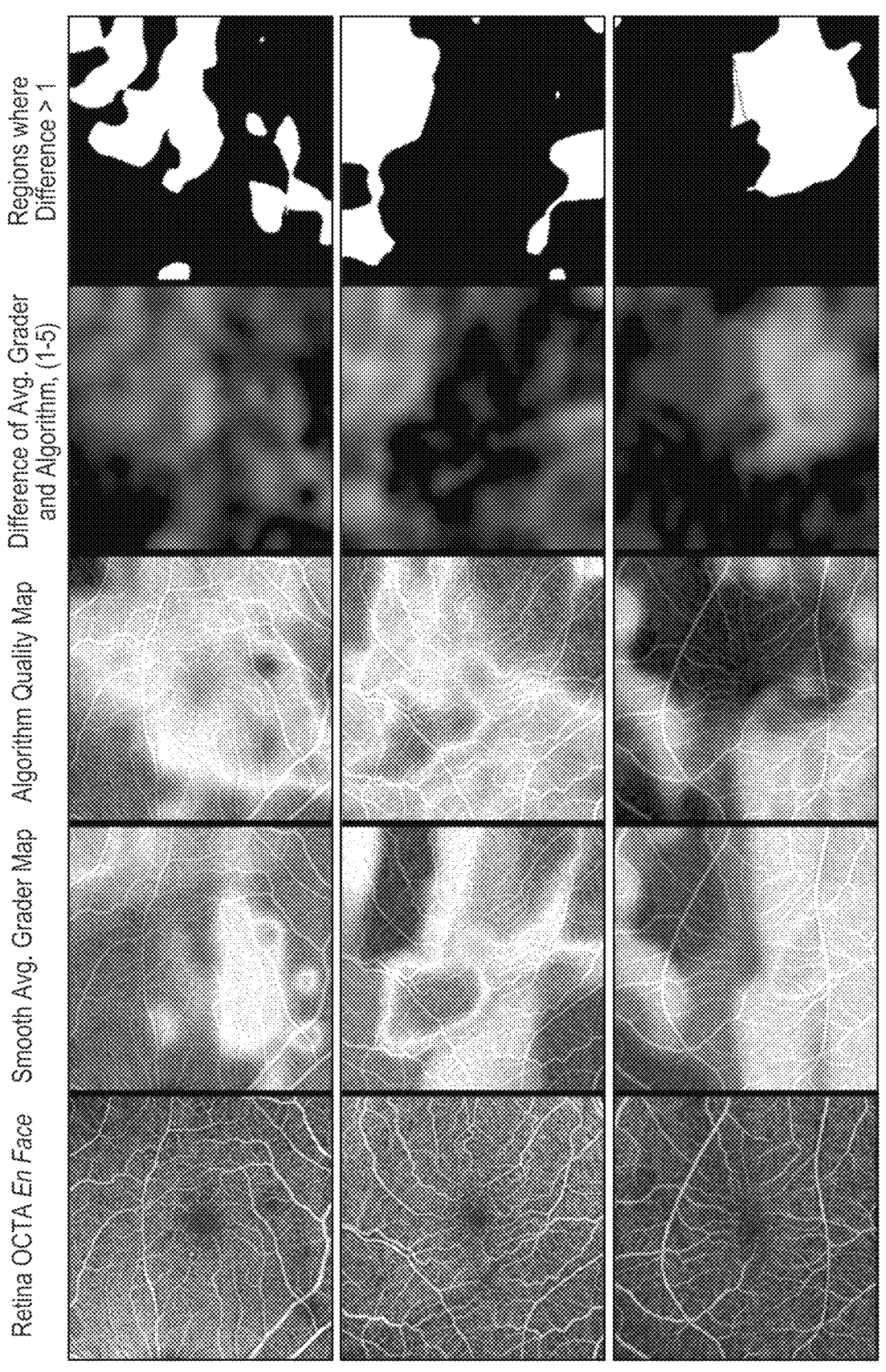
FIG. 13B shows examples of three images deemed sub-optimal from the 26 analyzed giving the same 20% deviation limit.

FIG. 13A shows (e.g., in color or grayscale) example results of three images deemed acceptable given this 20% deviation limit for passing, and FIG. 13B shows (e.g., in color or grayscale) examples of three images deemed suboptimal from the 26 analyzed giving the same 20% deviation limit. From left to right in both FIGS. 13A and 13B, the first column of images are retina slab examples ("Retina OCTA En Face," 131); the second column of images are corresponding ground truth maps ("Smooth Avg Grader Map," 132); the third column are the present algorithm's corresponding results ("Algorithm Quality Map," 133; the fourth column are representations of the differences between corresponding ground truth and the algorithm map results ("Diff of Grader and Algorithm," 134 scaled in a 0-5 grayscale; and the fifth column are representations of regions having a deviation larger than 1 ("Regions where Difference>1", 135). With reference to FIG. 13B, one can observe that while the regions of a deviation larger than 1 in the failure cases are larger than 20% of them images, the quality map algorithm still produces results (e.g., quality maps of column 133) that somewhat resemble the quality of their corresponding retinal slabs (e.g., retinal OCTA en face images of column 131).

Figure 14:
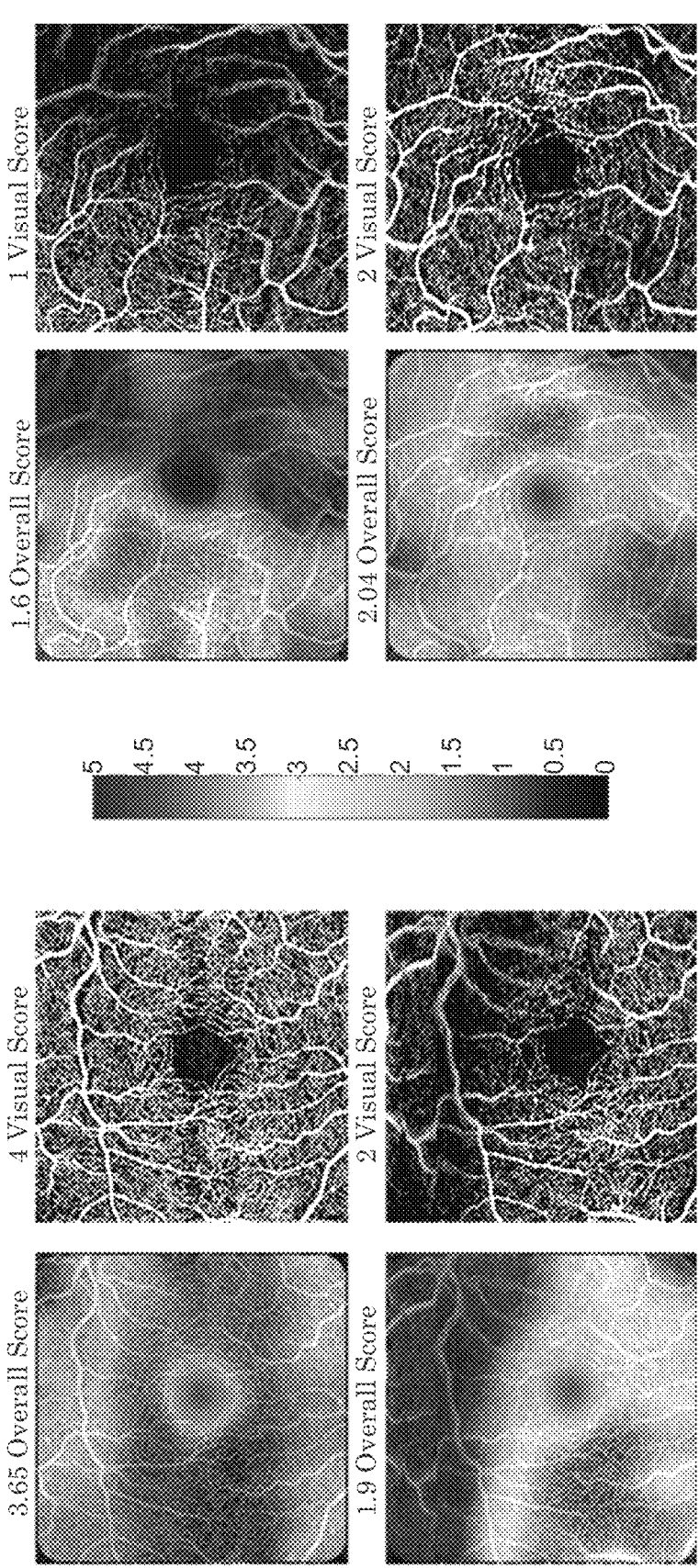
FIG. 14 shows a first example of the quality maps generated/obtained (using the present invention) from the right eye (four images on the left) and the left eye (four images on the right) of a first patient for different 3×3 mm OCTA acquisitions (as organized in pairs).

FIG. 14 shows (e.g., in color or grayscale) a first example of the quality maps generated/obtained (using the present invention) from the right eye (four images on the left) and the left eye (four images on the right) of a first patient for different 3×3 mm OCTA acquisitions (as organized in pairs).

Each pair of images shows the retina flow slab of the acquisition on the right with the assigned visual score given by a reader on top and an overlay angiography quality map on the left with overall average score computed by the present model on top (overlay also shows the retina flow slab). As can be seen, the computed overall scores correlate well with the given manual scores. Additionally, regions of higher quality in each slab are shown to have a higher regional score, as compared to regions of lower quality.

Figure 15:
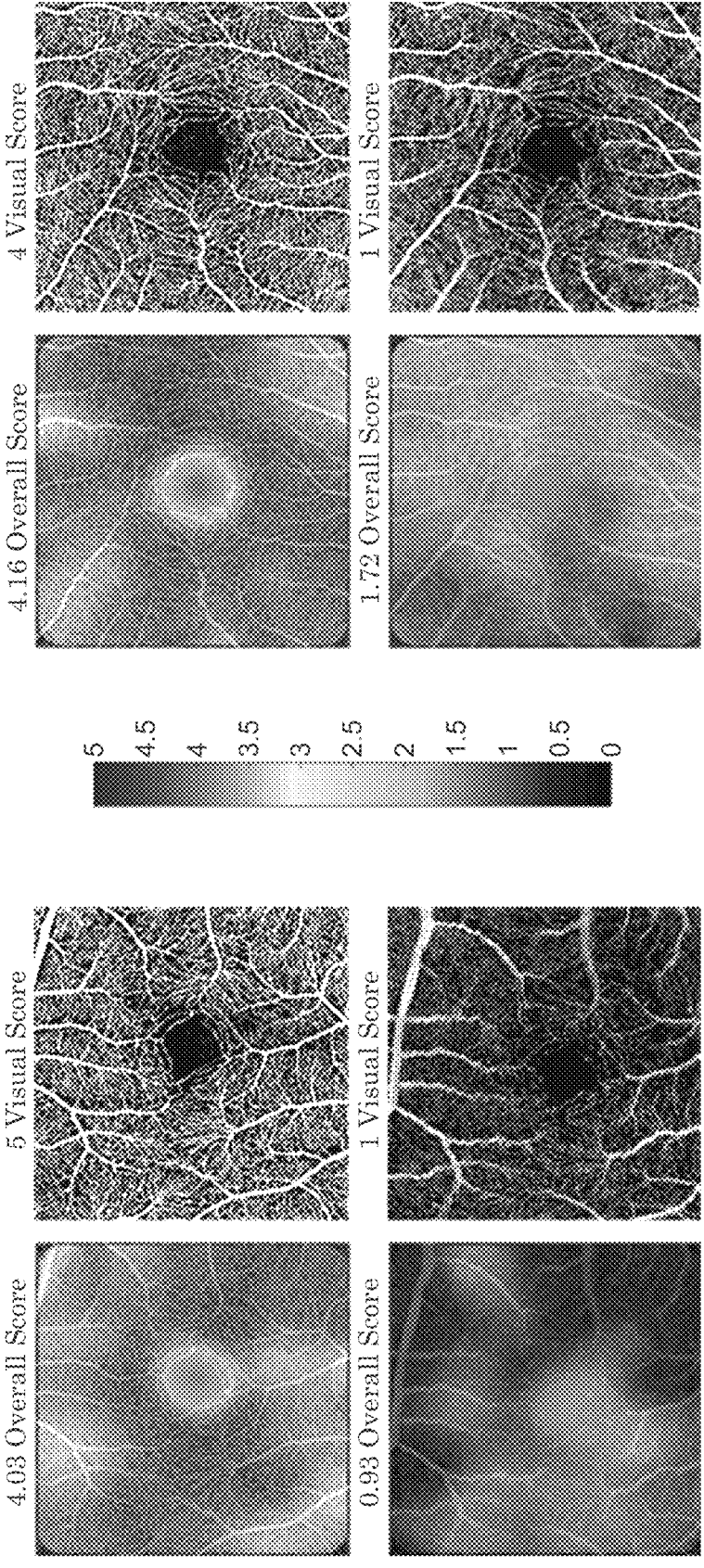
FIG. 15 shows a second example of quality maps obtained from the right eye (four images on the left) and the left eye (four images on the right) of a second patient for different 3×3 mm OCTA acquisitions (as organized in pairs).

FIG. 15 shows (e.g., in color or grayscale) a second example of quality maps obtained from the right eye (four images on the left) and the left eye (four images on the right) of a second patient for different 3×3 mm OCTA acquisitions (as organized in pairs). For ease of discussion, the results of FIG. 15 are displayed in a similar manner as those of FIG. 14. In the example of FIG. 15, one can clearly see how the acquisitions of higher quality result in a higher overall score, and how the regions of higher quality within each image also have a higher score.

Figure 16:
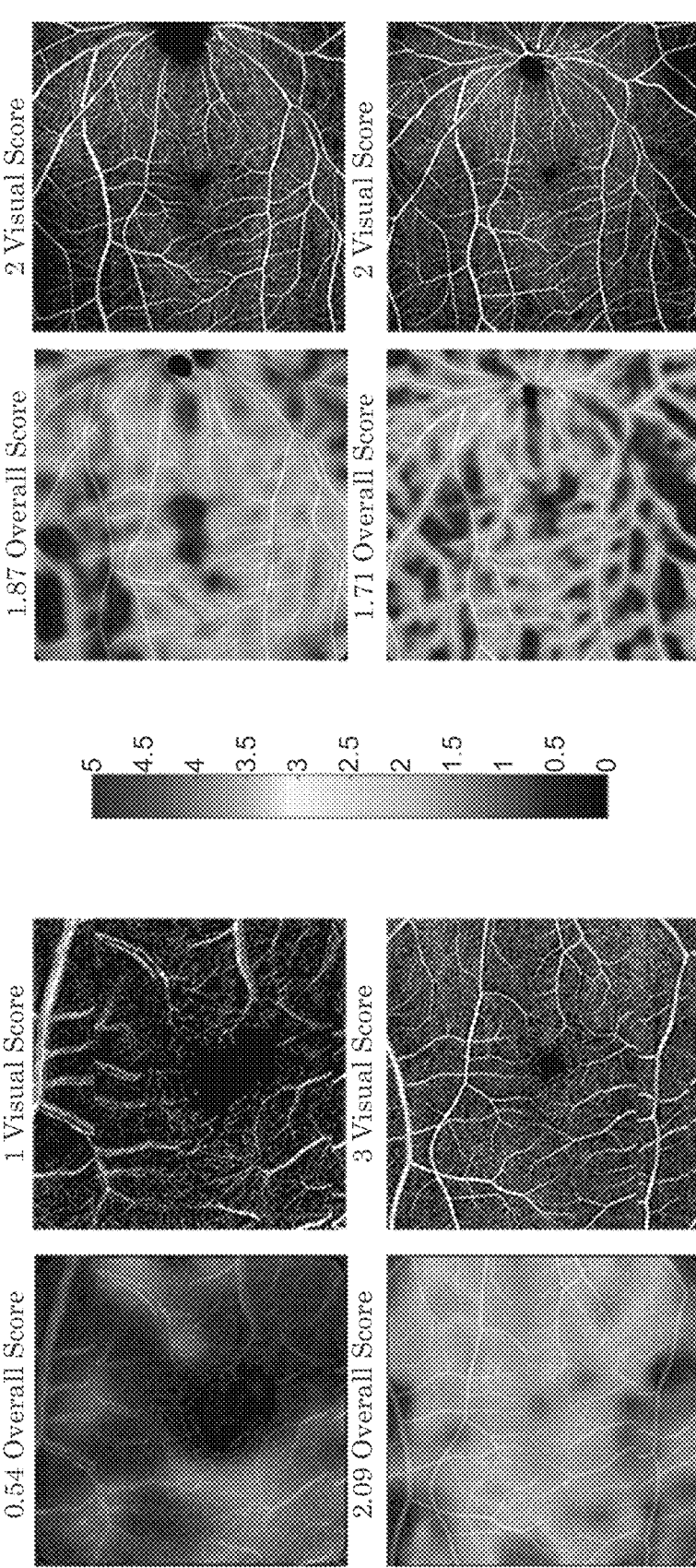
FIG. 16 shows an example of quality maps obtained from the right eye of a patient for OCTA acquisitions of different field-of-view (FOV): 3×3 mm, 6×6 mm, 9×9 mm, and 12×12 mm. OCTA acquisitions (as organized in pairs) are displayed in a manner similar to that of FIG. 14.

FIG. 16 shows (e.g., in color or grayscale) an example of quality maps obtained from the right eye of a patient for OCTA acquisitions of different FOV: 3×3 mm, 6×6 mm, 9×9 mm, and 12×12 mm. OCTA acquisitions (as organized in pairs) are displayed in a manner similar to that of FIG. 14. The example of FIG. 16 shows how the present approach is flexible for (e.g., accommodates) different scan sizes.

Comparison to Inter-Reader Variability

Figures 17, 18:
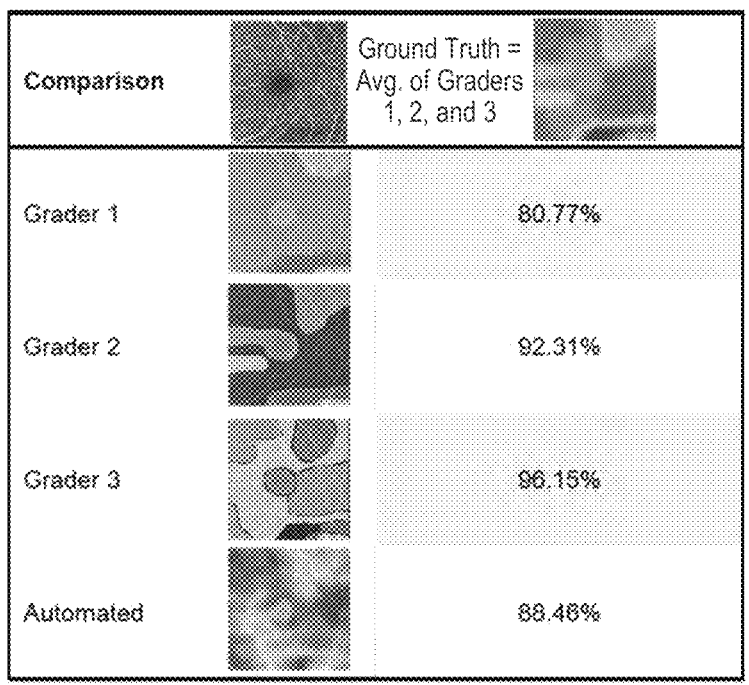
FIG. 17 provides the percentage of acceptable results from each human grader and the algorithm using the average of the three human graders as ground truth test data.
FIG. 18 provides the percentage of acceptable results obtained by comparing the annotations of each grader (separately removed, in turn, from those used to establish the ground truth test data) and the results of the algorithm to the average results of the other two remaining graders as ground truth test data.

To better understand the performance of the algorithm (e.g., as compared to a human expert), a test set of images was given for evaluation to the same three graders (readers) used to establish a ground truth training set used to train a model in accord with the present invention (e.g., algorithm) in an exemplary application. Ground truth test data was defined (e.g., for each test image in the test set of images) by taking the average of the quality evaluation results provided by the three graders. The individual results of each grader and the results produced by the present algorithm were compared with the ground truth test data, and their individual performance determined using the same standards of quality used to define a failure for the algorithm, as discussed above. More specifically, if 20% or more (e.g., not less than 20%) of submitted quality data of a test image deviated by more than 1 quality point from the ground truth test data, that test image result was deemed a fail. First, the annotations made by each of the three graders were compared to the average quality maps used as ground truth test data in the same manner. FIG. 17 provides the percentage of acceptable results from each human grader and the algorithm using the average of the three human graders as ground truth test data. Although this analysis is biased since the annotations from each grader are also included in the average annotations used as ground truth test data, one can observe that the percentage of acceptable results from the human graders are similar to those of the algorithm. Indeed, one of the human graders actually scored a lower rate of acceptable results than the algorithm.

In order to remove the bias, this experiment was separately repeated for each human grader by removing the results from one grader from the data used to establish the ground truth test data, and comparing the results of that removed grader to the revised ground truth test data. FIG. 18 provides the percentage of acceptable results obtained by comparing the annotations of each grader (separately removed, in turn, from those used to establish the ground truth test data) and the results of the algorithm to the average results of the other two remaining graders as ground truth test data. As shown, using this approach resulted in the percentage of acceptable results of the individual graders being lower than those of the algorithm, as compared to the ground truth test data. FIG. 18 highlights the good performance of the present algorithm, and its ability to generate quality maps that resemble quality annotations that the average expert grader would produce, given the difficulty of the task of grading scan quality in images, and the strict verification standards used.

Processing Speed

In an exemplary application, the average execution time for 26 scans (e.g., a combination of scans that needed, and did not need, additional Gaussian filtering) was 2.58 seconds (with 0.79 standard deviation). Within these 26 scans 11 scans needed additional Gaussian filtering (internal within the algorithm) while 15 of them did not. For those that needed Gaussian filtering, the average processing time was 2.9 seconds (0.96 std), while for those that did not need Gaussian filtering, the average processing time was 2.34 seconds (0.56 std).

Hereinafter is provided a description of various hardware and architectures suitable for the present invention.

Optical Coherence Tomography Imaging System

Generally, optical coherence tomography (OCT) uses low-coherence light to produce two-dimensional (2D) and three-dimensional (3D) internal views of biological tissue. OCT enables in vivo imaging of retinal structures. OCT angiography (OCTA) produces flow information, such as vascular flow from within the retina. Examples of OCT systems are provided in U.S. Pat. Nos. 6,741,359 and 9,706,915, and examples of an OCTA systems may be found in U.S. Pat. Nos. 9,700,206 and 9,759,544, all of which are herein incorporated in their entirety by reference. An exemplary OCT/OCTA system is provided herein.

FIG. 19 illustrates a generalized frequency domain optical coherence tomography (FD-OCT) system used to collect 3D image data of the eye suitable for use with the present invention. An FD-OCT system OCT_1 includes a light source, LtSrc1. Typical light sources include, but are not limited to, broadband light sources with short temporal coherence lengths or swept laser sources. A beam of light from light source LtSrc1 is routed, typically by optical fiber Fbr1, to illuminate a sample, e.g., eye E; a typical sample being tissues in the human eye. The light source LrSrc1 may, for example, be a broadband light source with short temporal coherence length in the case of spectral domain OCT (SD-OCT) or a wavelength tunable laser source in the case of swept source OCT (SS-OCT). The light may be scanned, typically with a scanner Scnr1 between the output of the optical fiber Fbr1 and the sample E, so that the beam of light (dashed line Bm) is scanned laterally over the region of the sample to be imaged. The light beam from scanner Scnr1 may pass through a scan lens SL and an ophthalmic lens OL and be focused onto the sample E being imaged. The scan lens SL may receive the beam of light from the scanner Scnr1 at multiple incident angles and produces substantially collimated light, ophthalmic lens OL may then focus onto the sample. The present example illustrates a scan beam that needs to be scanned in two lateral directions (e.g., in x and y directions on a Cartesian plane) to scan a desired field of view (FOV). An example of this would be a point-field OCT, which uses a point-field beam to scan across a sample. Consequently, scanner Scnr1 is illustratively shown to include two sub-scanner: a first sub-scanner Xscn for scanning the point-field beam across the sample in a first direction (e.g., a horizontal x-direction); and a second sub-scanner Yscn for scanning the point-field beam on the sample in traversing second direction (e.g., a vertical y-direction). If the scan beam were a line-field beam (e.g., a line-field OCT), which may sample an entire line-portion of the sample at a time, then only one scanner may be needed to scan the line-field beam across the sample to span the desired FOV. If the scan beam were a full-field beam (e.g., a full-field OCT), no scanner may be needed, and the full-field light beam may be applied across the entire, desired FOV at once.

Figure 27:
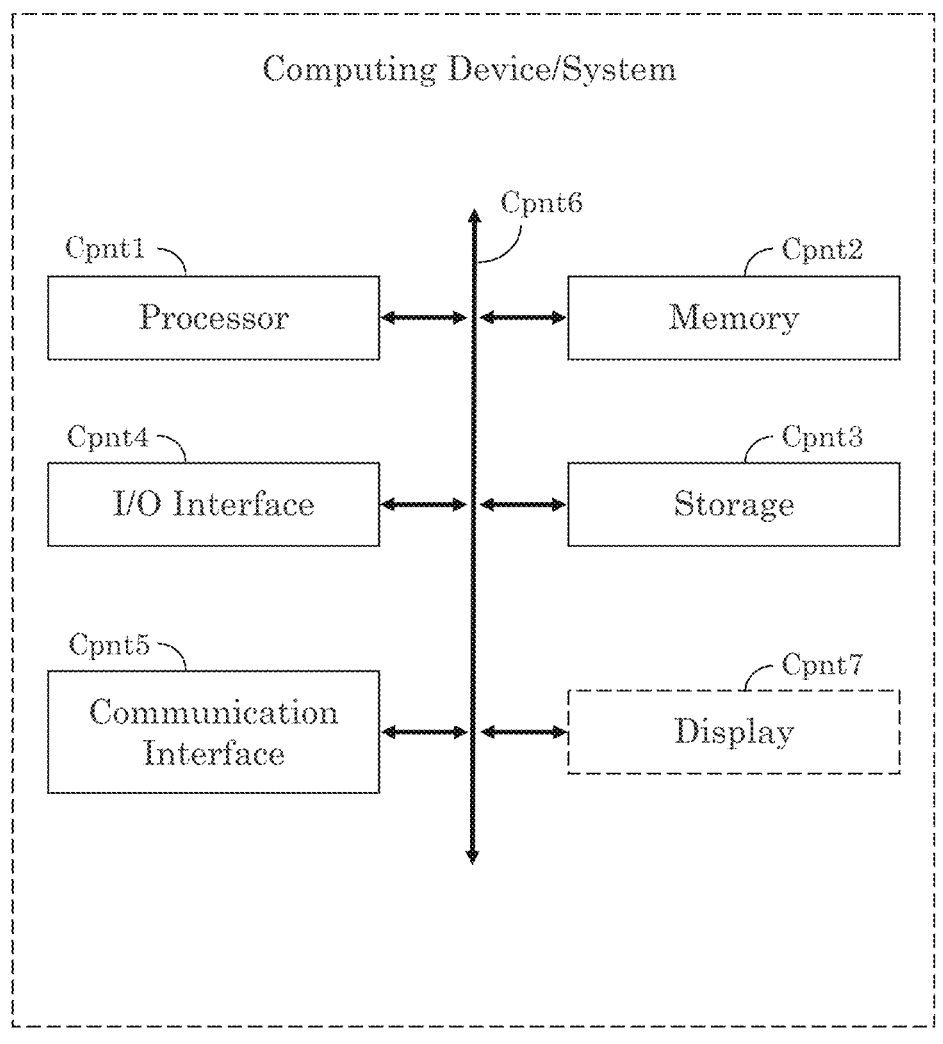
FIG. 27 illustrates an example computer system (or computing device or computer).

Irrespective of the type of beam used, light scattered from the sample (e.g., sample light) is collected. In the present example, scattered light returning from the sample is collected into the same optical fiber Fbr1 used to route the light for illumination. Reference light derived from the same light source LtSrc1 travels a separate path, in this case involving optical fiber Fbr2 and retroreflector RR1 with an adjustable optical delay. Those skilled in the art will recognize that a transmissive reference path can also be used and that the adjustable delay could be placed in the sample or reference arm of the interferometer. Collected sample light is combined with reference light, for example, in a fiber coupler Cplr1, to form light interference in an OCT light detector Dtctr1 (e.g., photodetector array, digital camera, etc.). Although a single fiber port is shown going to the detector Dtctr1, those skilled in the art will recognize that various designs of interferometers can be used for balanced or unbalanced detection of the interference signal. The output from the detector Dtctr1 is supplied to a processor (e.g., internal or external computing device) Cmp1 that converts the observed interference into depth information of the sample. The depth information may be stored in a memory associated with the processor Cmp1 and/or displayed on a display (e.g., computer/electronic display/screen) Scn1. The processing and storing functions may be localized within the OCT instrument, or functions may be offloaded onto (e.g., performed on) an external processor (e.g., an external computing device), to which the collected data may be transferred. An example of a computing device (or computer system) is shown in FIG. 27. This unit could be dedicated to data processing or perform other tasks which are quite general and not dedicated to the OCT device. The processor (computing device) Cmp1 may include, for example, a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that may performs some, or the entire, processing steps in a serial and/or parallelized fashion with one or more host processors and/or one or more external computing devices.

The sample and reference arms in the interferometer could consist of bulk-optics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—Holographic Optical Coherence Tomography," *Optics Letters,* 36(13): 2390 2011; Y. Nakamura, et al, "High-Speed Three Dimensional Human Retinal Imaging by Line Field Spectral Domain Optical Coherence Tomography," *Optics Express,* 15(12):7103 2007; Blazkiewicz et al, "Signal-To-Noise Ratio Study of Full-Field Fourier-Domain Optical Coherence Tomography," *Applied Optics,* 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram (Sj(k)). The real-valued spectral data typically goes through several post-processing steps including background subtraction, dispersion correction, etc. The Fourier transform of the processed interferogram, results in a complex valued OCT signal output $Aj(z)=|Aj|e i\varphi$. The absolute value of this complex OCT signal, $|Aj|$, reveals the profile of scattering intensities at different path lengths, and therefore scattering as a function of depth (z-direction) in the sample. Similarly, the phase, $\varphi j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow.

A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross-sectional image that includes the z-dimension. An example OCT B-scan image of a normal retina of a human eye is illustrated in FIG. 20. An OCT B-scan of the retinal provides a view of the structure of retinal tissue. For illustration purposes, FIG. 20 identifies various canonical retinal layers and layer boundaries. The identified retinal boundary layers include (from top to bottom): the inner limiting membrane (ILM) Lyer1, the retinal nerve fiber layer (RNFL or NFL) Layr2, the ganglion cell layer (GCL) Layr3, the inner plexiform layer (IPL) Layr4, the inner nuclear layer (INL) Layr5, the outer plexiform layer (OPL) Layr6, the outer nuclear layer (ONL) Layr7, the junction between the outer segments (OS) and inner segments (IS) (indicated by reference character Layr8) of the photoreceptors, the external or outer limiting membrane (ELM or OLM) Layr9, the retinal pigment epithelium (RPE) Layr10, and the Bruch's membrane (BM) Layr11.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are herein incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An en face image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 herein incorporated in its entirety by reference). OCT systems that provide an angiography imaging functionality may be termed OCT angiography (OCTA) systems.

FIG. 21 shows an example of an en face vasculature image. After processing the data to highlight motion contrast using any of the motion contrast techniques known in the art, a range of pixels corresponding to a given tissue depth from the surface of internal limiting membrane (ILM) in retina, may be summed to generate the en face (e.g., frontal view) image of the vasculature. FIG. 22 shows an exemplary B-scan of a vasculature (OCTA) image. As illustrated, structural information may not be well-defined since blood flow may traverse multiple retinal layers making them less defined than in a structural OCT B-scan, as shown in FIG. 20. Nonetheless, OCTA provides a non-invasive technique for imaging the microvasculature of the retina and the choroid, which may be critical to diagnosing and/or monitoring various pathologies. For example, OCTA may be used to identify diabetic retinopathy by identifying microaneurysms, neovascular complexes, and quantifying foveal avascular zone and nonperfused areas. Moreover, OCTA has been shown to be in good agreement with fluorescein angiography (FA), a more traditional, but more evasive, technique requiring the injection of a dye to observe vascular flow in the retina. Additionally, in dry age-related macular degeneration, OCTA has been used to monitor a general decrease in choriocapillaris flow. Similarly in wet age-related macular degeneration, OCTA can provides a qualitative and quantitative analysis of choroidal neovascular membranes. OCTA has also been used to study vascular occlusions, e.g., evaluation of nonperfused areas and the integrity of superficial and deep plexus.

Neural Networks

As discussed above, the present invention may use a neural network (NN) machine learning (ML) model. For the sake of completeness, a general discussion of neural networks is provided herein. The present invention may use any, singularly or in combination, of the below described neural network architecture(s). A neural network, or neural net, is a (nodal) network of interconnected neurons, where each neuron represents a node in the network. Groups of neurons may be arranged in layers, with the outputs of one layer feeding forward to a next layer in a multilayer perceptron (MLP) arrangement. MLP may be understood to be a feedforward neural network model that maps a set of input data onto a set of output data.

Figure 23:
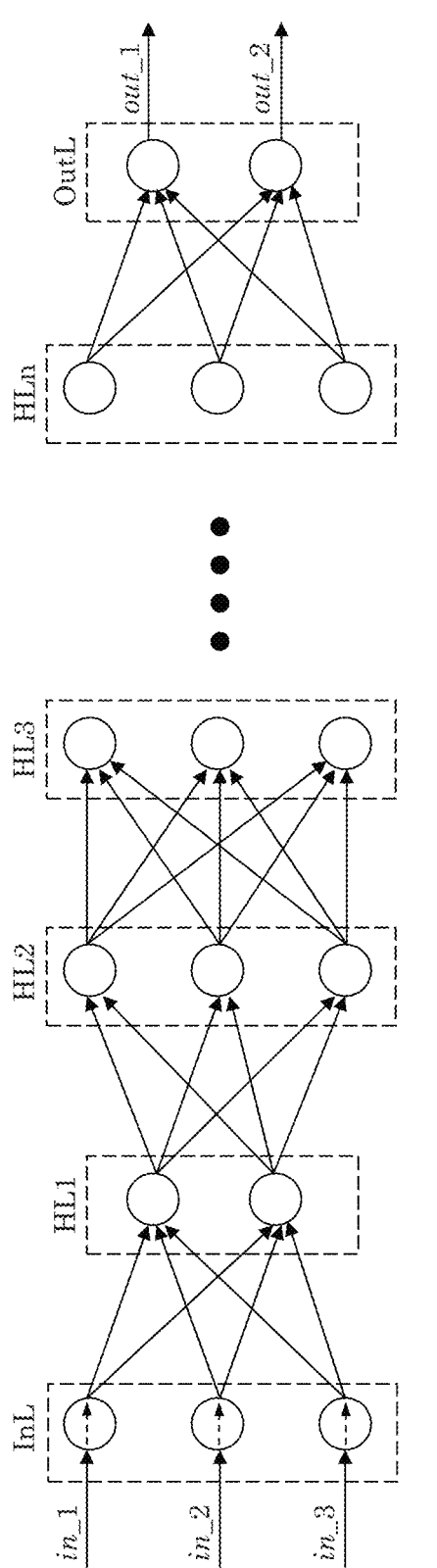
FIG. 23 illustrates an example of a multilayer perceptron (MLP) neural network.

FIG. 23 illustrates an example of a multilayer perceptron (MLP) neural network. Its structure may include multiple hidden (e.g., internal) layers HL1 to HLn that map an input layer InL (that receives a set of inputs (or vector input) in_1 to in_3) to an output layer OutL that produces a set of outputs (or vector output), e.g., out_1 and out_2. Each layer may have any given number of nodes, which are herein illustratively shown as circles within each layer. In the present example, the first hidden layer HL1 has two nodes, while hidden layers HL2, HL3, and HLn each have three nodes. Generally, the deeper the MLP (e.g., the greater the number of hidden layers in the MLP), the greater its capacity to learn. The input layer InL receives a vector input (illustratively shown as a three-dimensional vector consisting of in_1, in_2 and in_3), and may apply the received vector input to the first hidden layer HL1 in the sequence of hidden layers. An output layer OutL receives the output from the last hidden layer, e.g., HLn, in the multilayer model, processes its inputs, and produces a vector output result (illustratively shown as a two-dimensional vector consisting of out_1 and out_2).

Typically, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function to its inputs to produce an output for that node. Nodes in hidden layers (e.g., learning layers) may apply the same function to their respective input(s) to produce their respective output(s). Some nodes, however, such as the nodes in the input layer InL receive only one input and may be passive, meaning that they simply relay the values of their single input to their output(s), e.g., they provide a copy of their input to their output(s), as illustratively shown by dotted arrows within the nodes of input layer InL.

Figure 24:
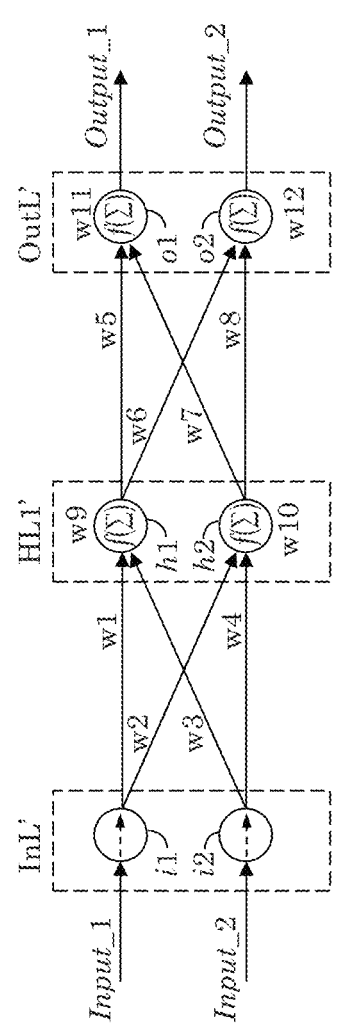
FIG. 24 shows a simplified neural network consisting of an input layer, a hidden layer, and an output layer.

For illustration purposes, FIG. 24 shows a simplified neural network consisting of an input layer InL', a hidden layer HL1', and an output layer OutL'. Input layer InL' is shown having two input nodes i1 and i2 that respectively receive inputs Input_1 and Input_2 (e.g. the input nodes of layer InL' receive an input vector of two dimensions). The input layer InL' feeds forward to one hidden layer HL1' having two nodes h1 and h2, which in turn feeds forward to an output layer OutL' of two nodes o1 and o2. Interconnections, or links, between neurons (illustrative shown as solid arrows) have weights w1 to w8. Typically, except for the input layer, a node (neuron) may receive as input the outputs of nodes in its immediately preceding layer. Each node may calculate its output by multiplying each of its inputs by each input's corresponding interconnection weight, summing the products of it inputs, adding (or multiplying by) a constant defined by another weight or bias that may be associated with that particular node (e.g., node weights w9, w10, w11, w12 respectively corresponding to nodes h1, h2, o1, and o2), and then applying a non-linear function or logarithmic function to the result. The non-linear function may be termed an activation function or transfer function. Multiple activation functions are known the art, and selection of a specific activation function is not critical to the present discussion. It is noted, however, that operation of the ML model, or behavior of the neural net, is dependent upon weight values, which may be learned so that the neural network provides a desired output for a given input.

The neural net learns (e.g., is trained to determine) appropriate weight values to achieve a desired output for a given input during a training, or learning, stage. Before the neural net is trained, each weight may be individually assigned an initial (e.g., random and optionally non-zero) value, e.g. a random-number seed. Various methods of assigning initial weights are known in the art. The weights are then trained (optimized) so that for a given training vector input, the neural network produces an output close to a desired (predetermined) training vector output. For example, the weights may be incrementally adjusted in thousands of iterative cycles by a technique termed back-propagation. In each cycle of back-propagation, a training input (e.g., vector input or training input image/sample) is fed forward through the neural network to determine its actual output (e.g., vector output). An error for each output neuron, or output node, is then calculated based on the actual neuron output and a target training output for that neuron (e.g., a training output image/sample corresponding to the present training input image/sample). One then propagates back through the neural network (in a direction from the output layer back to the input layer) updating the weights based on how much effect each weight has on the overall error so that the output of the neural network moves closer to the desired training output. This cycle is then repeated until the actual output of the neural network is within an acceptable error range of the desired training output for the given training input. As it would be understood, each training input may require many back-propagation iterations before achieving a desired error range. Typically, an epoch refers to one back-propagation iteration (e.g., one forward pass and one backward pass) of all the training samples, such that training a neural network may require many epochs. Generally, the larger the training set, the better the performance of the trained ML model, so various data augmentation methods may be used to increase the size of the training set. For example, when the training set includes pairs of corresponding training input images and training output images, the training images may be divided into multiple corresponding image segments (or patches). Corresponding patches from a training input image and training output image may be paired to define multiple training patch pairs from one input/output image pair, which enlarges the training set. Training on large training sets, however, places high demands on computing resources, e.g. memory and data processing resources. Computing demands may be reduced by dividing a large training set into multiple mini-batches, where the mini-batch size defines the number of training samples in one forward/backward pass. In this case, and one epoch may include multiple mini-batches. Another issue is the possibility of a NN overfitting a training set such that its capacity to generalize from a specific input to a different input is reduced. Issues of overfitting may be mitigated by creating an ensemble of neural networks or by randomly dropping out nodes within a neural network during training, which effectively removes the dropped nodes from the neural network. Various dropout regulation methods, such as inverse dropout, are known in the art.

It is noted that the operation of a trained NN machine model is not a straight-forward algorithm of operational/analyzing steps. Indeed, when a trained NN machine model receives an input, the input is not analyzed in the traditional sense. Rather, irrespective of the subject or nature of the input (e.g., a vector defining a live image/scan or a vector defining some other entity, such as a demographic description or a record of activity) the input will be subjected to the same predefined architectural construct of the trained neural network (e.g., the same nodal/layer arrangement, trained weight and bias values, predefined convolution/deconvolution operations, activation functions, pooling operations, etc.), and it may not be clear how the trained network's architectural construct produces its output. Furthermore, the values of the trained weights and biases are not deterministic and depend upon many factors, such as the amount of time the neural network is given for training (e.g., the number of epochs in training), the random starting values of the weights before training starts, the computer architecture of the machine on which the NN is trained, selection of training samples, distribution of the training samples among multiple mini-batches, choice of activation function(s), choice of error function(s) that modify the weights, and even if training is interrupted on one machine (e.g., having a first computer architecture) and completed on another machine (e.g., having a different computer architecture). The point is that the reasons why a trained ML model reaches certain outputs is not clear, and much research is currently ongoing to attempt to determine the factors on which a ML model bases its outputs. Therefore, the processing of a neural network on live data cannot be reduced to a simple algorithm of steps. Rather, its operation is dependent upon its training architecture, training sample sets, training sequence, and various circumstances in the training of the ML model.

In summary, construction of a NN machine learning model may include a learning (or training) stage and a classification (or operational) stage. In the learning stage, the neural network may be trained for a specific purpose and may be provided with a set of training examples, including training (sample) inputs and training (sample) outputs, and optionally including a set of validation examples to test the progress of the training. During this learning process, various weights associated with nodes and node-interconnections in the neural network are incrementally adjusted in order to reduce an error between an actual output of the neural network and the desired training output. In this manner, a multi-layer feedforward neural network (such as discussed above) may be made capable of approximating any measurable function to any desired degree of accuracy. The result of the learning stage is a (neural network) machine learning (ML) model that has been learned (e.g., trained). In the operational stage, a set of test inputs (or live inputs) may be submitted to the learned (trained) ML model, which may apply what it has learned to produce an output prediction based on the test inputs.

Like the regular neural networks of FIGS. 23 and 24, convolutional neural networks (CNN) are also made up of neurons that have learnable weights and biases. Each neuron receives inputs, performs an operation (e.g., dot product), and is optionally followed by a non-linearity. The CNN, however, may receive raw image pixels at one end (e.g., the input end) and provide classification (or class) scores at the other end (e.g., the output end). Because CNNs expect an image as input, they are optimized for working with volumes (e.g., pixel height and width of an image, plus the depth of the image, e.g., color depth such as an RGB depth defined of three colors: red, green, and blue). For example, the layers of a CNN may be optimized for neurons arranged in three dimensions. The neurons in a CNN layer may also be connected to a small region of the layer before it, instead of all of the neurons in a fully-connected NN. The final output layer of a CNN may reduce a full image into a single vector (classification) arranged along the depth dimension.

Figure 25:
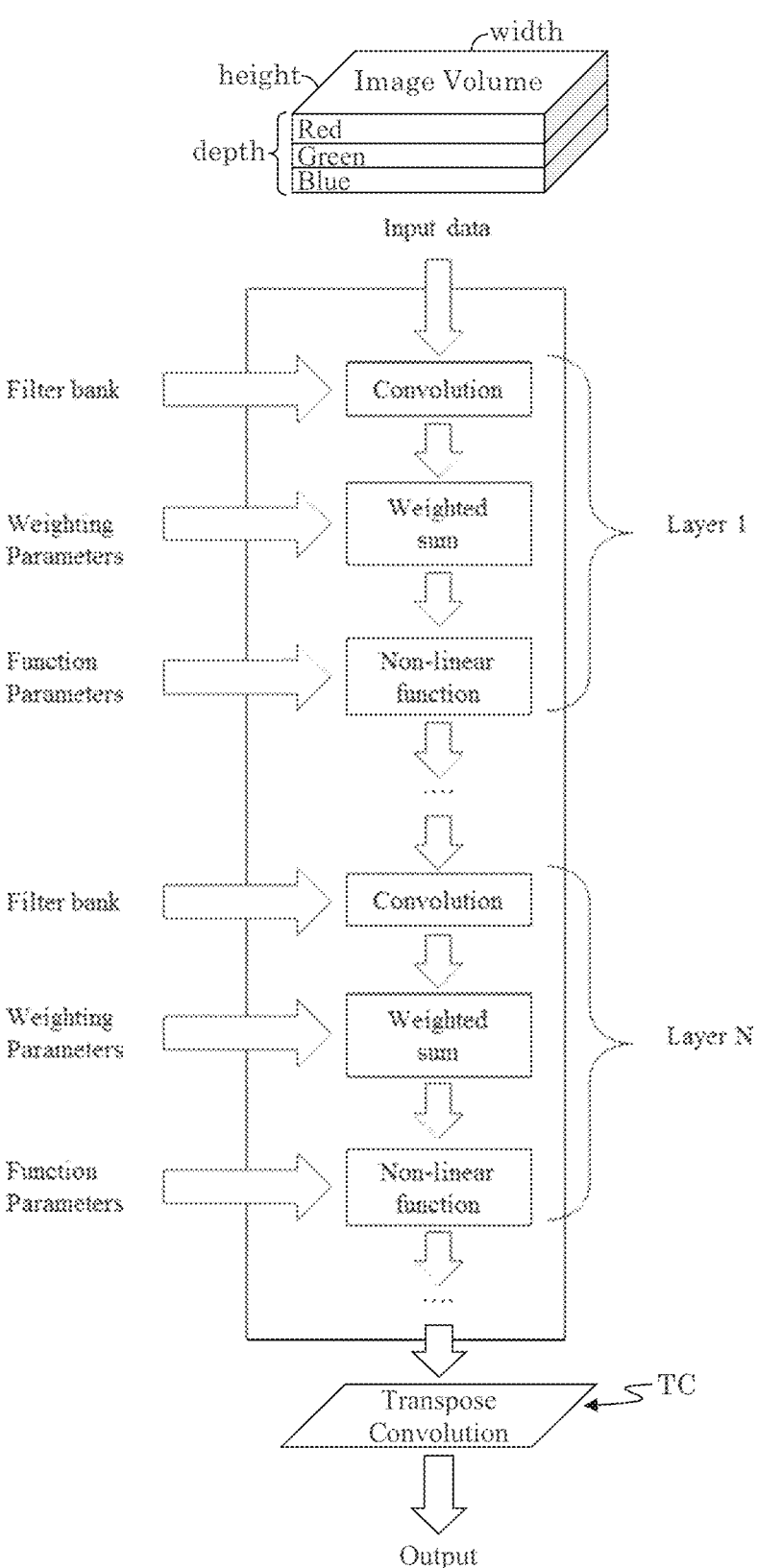
FIG. 25 illustrates an example convolutional neural network architecture.

FIG. 25 provides an example convolutional neural network architecture. A convolutional neural network may be defined as a sequence of two or more layers (e.g., Layer 1 to Layer N), where a layer may include a (image) convolution step, a weighted sum (of results) step, and a non-linear function step. The convolution may be performed on its input data by applying a filter (or kernel), e.g. on a moving window across the input data, to produce a feature map. Each layer and component of a layer may have different pre-determined filters (from a filter bank), weights (or weighting parameters), and/or function parameters. In the present example, the input data is an image, which may be raw pixel values of the image, of a given pixel height and width. In the present example, the input image is illustrated as having a depth of three color channels RGB (Red, Green, and Blue). Optionally, the input image may undergo various preprocessing, and the preprocessing results may be input in place of, or in addition to, the raw input image. Some examples of image preprocessing may include: retina blood vessel map segmentation, color space conversion, adaptive histogram equalization, connected components generation, etc. Within a layer, a dot product may be computed between the given weights and a small region they are connected to in the input volume. Many ways of configuring a CNN are known in the art, but as an example, a layer may be configured to apply an elementwise activation function, such as max (0,x) thresholding at zero. A pooling function may be performed (e.g., along the x-y directions) to down-sample a volume. A fully-connected layer may be used to determine the classification output and produce a one-dimensional output vector, which has been found useful for image recognition and classification. However, for image segmentation, the CNN would need to classify each pixel. Since each CNN layers tends to reduce the resolution of the input image, another stage is needed to up-sample the image back to its original resolution. This may be achieved by application of a transpose convolution (or deconvolution) stage TC, which typically does not use any predefine interpolation method, and instead has learnable parameters.

Convolutional Neural Networks have been successfully applied to many computer vision problems. As explained above, training a CNN generally requires a large training dataset. The U-Net architecture is based on CNNs and can generally be trained on a smaller training dataset than conventional CNNs.

Figure 26:
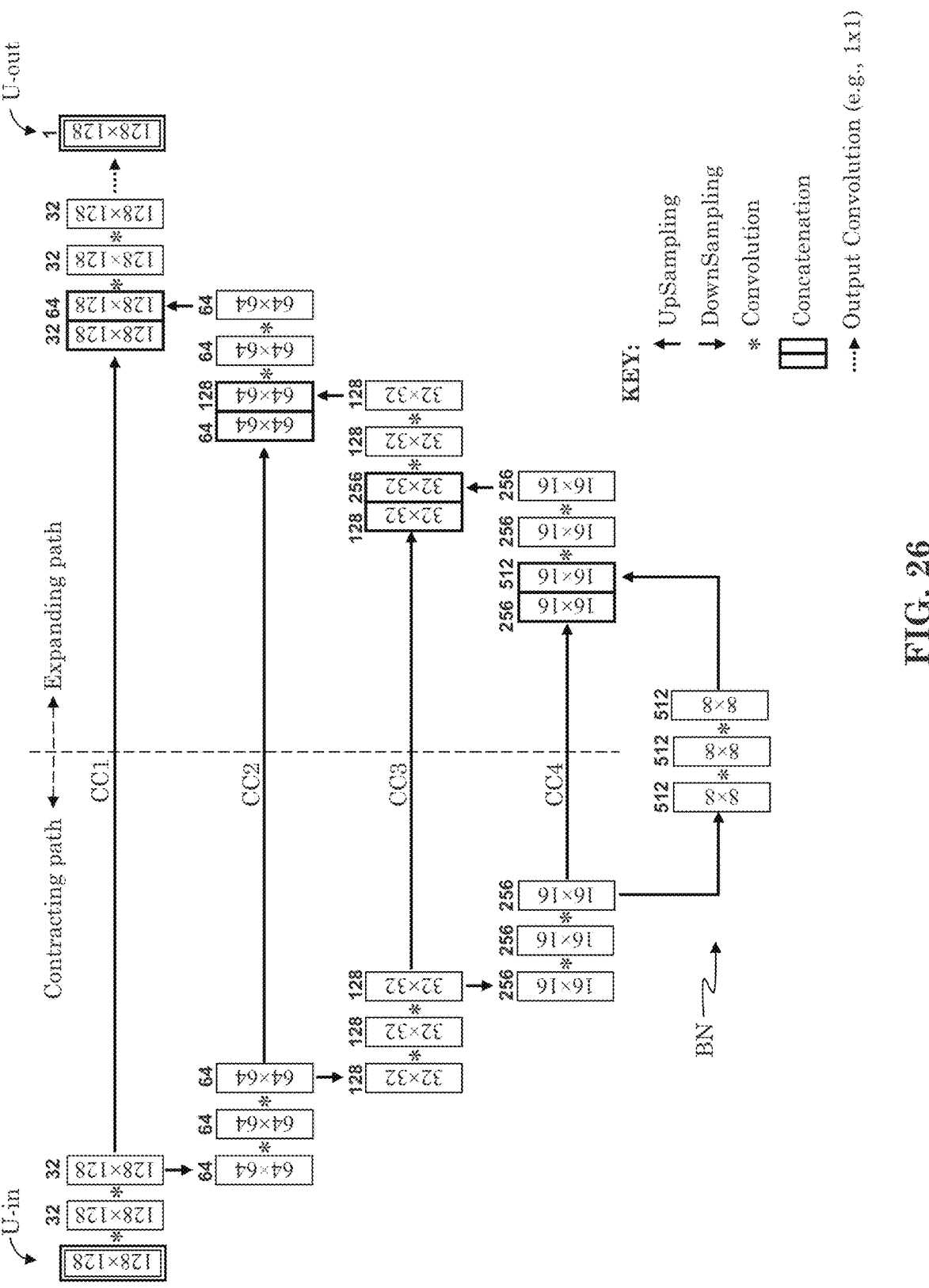
FIG. 26 illustrates an example U-Net architecture.

FIG. 26 illustrates an example U-Net architecture. The present exemplary U-Net includes an input module (or input layer or stage) that receives an input U-in (e.g., input image or image patch) of any given size. For illustration purposes, the image size at any stage, or layer, is indicated within a box that represents the image, e.g., the input module encloses number "128×128" to indicate that input image U-in is comprised of 128 by 128 pixels. The input image may be a fundus image, an OCT/OCTA en face, B-scan image, etc. It is to be understood, however, that the input may be of any size or dimension. For example, the input image may be an RGB color image, monochrome image, volume image, etc. The input image undergoes a series of processing layers, each of which is illustrated with exemplary sizes, but these sizes are illustration purposes only and would depend, for example, upon the size of the image, convolution filter, and/or pooling stages. The present architecture consists of a contracting path (herein illustratively comprised of four encoding modules) followed by an expanding path (herein illustratively comprised of four decoding modules), and copy-and-crop links (e.g., CC1 to CC4) between corresponding modules/stages that copy the output of one encoding module in the contracting path and concatenates it to (e.g., appends it to the back of) the up-converted input of a correspond decoding module in the expanding path. This results in a characteristic U-shape, from which the architecture draws its name. Optionally, such as for computational considerations, a "bottleneck" module/stage (BN) may be positioned between the contracting path and the expanding path. The bottleneck BN may consist of two convolutional layers (with batch normalization and optional dropout).

The contracting path is similar to an encoder, and generally captures context (or feature) information by the use of feature maps. In the present example, each encoding module in the contracting path may include two or more convolutional layers, illustratively indicated by an asterisk symbol "*", and which may be followed by a max pooling layer (e.g., DownSampling layer). For example, input image U-in is illustratively shown to undergo two convolution layers, each with 32 feature maps. As it would be understood, each convolution kernel produces a feature map (e.g., the output from a convolution operation with a given kernel is an image typically termed a "feature map"). For example, input U-in undergoes a first convolution that applies 32 convolution kernels (not shown) to produce an output consisting of 32 respective feature maps. However, as it is known in the art, the number of feature maps produced by a convolution operation may be adjusted (up or down). For example, the number of feature maps may be reduced by averaging groups of feature maps, dropping some feature maps, or other known method of feature map reduction. In the present example, this first convolution is followed by a second convolution whose output is limited to 32 feature maps. Another way to envision feature maps may be to think of the output of a convolution layer as a 3D image whose 2D dimension/plane is given by the listed X-Y planar pixel dimension (e.g., 128×128 pixels), and whose depth is given by the number of feature maps (e.g., 32 planar images deep). Following this analogy, the output of the second convolution (e.g., the output of the first encoding module in the contracting path) may be described as a 128×128×32 image. The output from the second convolution then undergoes a pooling operation, which reduces the 2D dimension of each feature map (e.g., the X and Y dimensions may each be reduced by half). The pooling operation may be embodied within the DownSampling operation, as indicated by a downward arrow. Several pooling methods, such as max pooling, are known in the art and the specific pooling method is not critical to the present invention. The number of feature maps may double at each pooling, starting with 32 feature maps in the first encoding module (or block), 64 in the second encoding module, and so on. The contracting path thus forms a convolutional network consisting of multiple encoding modules (or stages or blocks). As is typical of convolutional networks, each encoding module may provide at least one convolution stage followed by an activation function (e.g., a rectified linear unit (ReLU) or sigmoid layer), not shown, and a max pooling operation. Generally, an activation function introduces non-linearity into a layer (e.g., to help avoid overfitting issues), receives the results of a layer, and determines whether to "activate" the output (e.g., determines whether the value of a given node meets predefined criteria to have an output forwarded to a next layer/node). In summary, the contracting path generally reduces spatial information while increasing feature information.

The expanding path is similar to a decoder, and among other things, may provide localization and spatial information for the results of the contracting path, despite the down sampling and any max-pooling performed in the contracting stage. The expanding path includes multiple decoding modules, where each decoding module concatenates its current up-converted input with the output of a corresponding encoding module. In this manner, feature and spatial information are combined in the expanding path through a sequence of up-convolutions (e.g., UpSampling or transpose convolutions or deconvolutions) and concatenations with high-resolution features from the contracting path (e.g., via CC1 to CC4). Thus, the output of a deconvolution layer is concatenated with the corresponding (optionally cropped) feature map from the contracting path, followed by two convolutional layers and activation function (with optional batch normalization).

The output from the last expanding module in the expanding path may be fed to another processing/training block or layer, such as a classifier block, that may be trained along with the U-Net architecture. Alternatively, or in addition, the output of the last upsampling block (at the end of the expanding path) may be submitted to another convolution (e.g., an output convolution) operation, as indicated by a dotted arrow, before producing its output U-out. The kernel size of output convolution may be selected to reduce the dimensions of the last upsampling block to a desired size. For example, the neural network may have multiple features per pixels right before reaching the output convolution, which may provide a 1×1 convolution operation to combine these multiple features into a single output value per pixel, on a pixel-by-pixel level.

Computing Device/System

FIG. 27 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cpnt1, memory Cpnt2, storage Cpnt3, an input/output (I/O) interface Cpnt4, a communication interface Cpnt5, and a bus Cpnt6. The computer system may optionally also include a display Cpnt7, such as a computer monitor or screen.

Processor Cpnt1 includes hardware for executing instructions, such as those making up a computer program. For example, processor Cpnt1 may be a central processing unit (CPU) or a general-purpose computing on graphics processing unit (GPGPU). Processor Cpnt1 may retrieve (or fetch) the instructions from an internal register, an internal cache, memory Cpnt2, or storage Cpnt3, decode and execute the instructions, and write one or more results to an internal register, an internal cache, memory Cpnt2, or storage Cpnt3. In particular embodiments, processor Cpnt1 may include one or more internal caches for data, instructions, or addresses. Processor Cpnt1 may include one or more instruction caches, one or more data caches, such as to hold data tables. Instructions in the instruction caches may be copies of instructions in memory Cpnt2 or storage Cpnt3, and the instruction caches may speed up retrieval of those instructions by processor Cpnt1. Processor Cpnt1 may include any suitable number of internal registers, and may include one or more arithmetic logic units (ALUs). Processor Cpnt1 may be a multi-core processor; or include one or more processors Cpnt1. Although this disclosure describes and illustrates a particular processor, this disclosure contemplates any suitable processor.

Memory Cpnt2 may include main memory for storing instructions for processor Cpnt1 to execute or to hold interim data during processing. For example, the computer system may load instructions or data (e.g., data tables) from storage Cpnt3 or from another source (such as another computer system) to memory Cpnt2. Processor Cpnt1 may load the instructions and data from memory Cpnt2 to one or more internal register or internal cache. To execute the instructions, processor Cpnt1 may retrieve and decode the instructions from the internal register or internal cache. During or after execution of the instructions, processor Cpnt1 may write one or more results (which may be intermediate or final results) to the internal register, internal cache, memory Cpnt2 or storage Cpnt3. Bus Cpnt6 may include one or more memory buses (which may each include an address bus and a data bus) and may couple processor Cpnt1 to memory Cpnt2 and/or storage Cpnt3. Optionally, one or more memory management unit (MMU) facilitate data transfers between processor Cpnt1 and memory Cpnt2. Memory Cpnt2 (which may be fast, volatile memory) may include random access memory (RAM), such as dynamic RAM (DRAM) or static RAM (SRAM). Storage Cpnt3 may include long-term or mass storage for data or instructions. Storage Cpnt3 may be internal or external to the computer system, and include one or more of a disk drive (e.g., hard-disk drive, HDD, or solid-state drive, SSD), flash memory, ROM, EPROM, optical disc, magneto-optical disc, magnetic tape, Universal Serial Bus (USB)-accessible drive, or other type of non-volatile memory.

I/O interface Cpnt4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device, or a combination of two or more of these.

Communication interface Cpnt5 may provide network interfaces for communication with other systems or networks. Communication interface Cpnt5 may include a Bluetooth interface or other type of packet-based communication. For example, communication interface Cpnt5 may include a network interface controller (NIC) and/or a wireless NIC or a wireless adapter for communicating with a wireless network. Communication interface Cpnt5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cpnt6 may provide a communication link between the above-mentioned components of the computing system. For example, bus Cpnt6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. A method for generating a quality measure of optical coherence tomography (OCT) data, comprising:
    acquiring a volume of OCT data;
    defining one or more slab views from the volume OCT data, wherein each slab view is a frontal, planar view of a sub-volume of the volume of OCT data;
    generating a plurality of feature maps from each slab view;
    determining the quality measure based on image properties of the plurality of feature maps; and
    displaying the quality measure or storing the quality measure for further processing,
    wherein the image properties of the feature maps include image texture features Haralick features.

2. The method of claim 1, wherein a plurality of said slab views are defined.

3. The method of claim 1, wherein determining the quality measure includes submitting the plurality of feature maps to a machine model trained using a plurality of pre-graded OCT data volume samples, one or more training slab view defined per OCT data volume sample, and a plurality of training feature maps generated from each training slab view.

4. The method of claim 3, wherein the machine model is a deep learning model.

5. The method of claim 3, wherein the machine model is a neural network model.

6. The method of claim 1, wherein the OCT data is OCT angiography data.

7. The method of claim 1, wherein the quality measure is a two-dimensional (2D) quality map identifying a quality measure for different regions of its corresponding slab view.

8. The method of claim 7, wherein:

determining the quality measure includes submitting the plurality of feature maps to a machine model trained to determine the quality maps based on the plurality of feature maps; and the machine model is further trained to identify one or more causes of a quality region within the quality map having a lower quality measure than a predefined threshold, and identifying one or more corrective actions to improve the lower quality measure in a subsequent OCT acquisition.

9. The method of claim 8 wherein the one or more causes are selected from a predefined list of error-sources including one or more of incorrect focusing, opacities, illumination below a predefined threshold, light penetration less than a predefined threshold, tracking or motion artifacts, and noise above a predefined threshold.

10. The method of claim 8, wherein the one or more corrective actions include a focus adjustment, a recommendation for pupil dilation, identifying an alternate imaging angle, or identifying possible cause of loss of eye tracking.

11. The method of claim 8, wherein the corrective action is output to an electronic display.

12. The method of claim 8, wherein the corrective action is transferred to an automated sub-system that automatically implements the corrective action prior to the subsequent acquisition.

13. The method of claim 7, further including defining an overall quality score for the acquisition based at least in part on the average of the individual quality measure distribution of the quality map.

14. The method of claim 7, wherein the acquisition is an OCTA acquisition defined from a plurality of OCT scans of the same region of the retina, and the method further includes defining an overall quality score for the OCTA acquisition based at least in part on the average of the individual quality measure distribution of the quality maps of the plurality of OCT scans from which the OCTA acquisition is defined.

15. The method of claim 7, further including, identifying a target region within the acquisition, and designating the entire acquisition as good or bad based on the quality map measures corresponding to the target region.

16. A method for generating a quality measure of optical coherence tomography (OCT) data, comprising:

acquiring a volume of OCT data;

defining one or more slab views from the volume OCT data;

generating a plurality of feature maps from each slab view;

determining the quality measure based on image properties of the plurality of feature maps;

displaying the quality measure or storing the quality measure for further processing, wherein the quality measure is a two-dimensional (2D) quality map identifying a quality measure for different regions of its corresponding slab view; and wherein acquiring a volume of OCT data includes:

a) collecting a plurality of different OCT volume samples of the same retinal tissue region;

b) applying to each of the OCT volume samples the steps of defining one or more slab views, generating the plurality of feature maps, and determining the quality measure based on the plurality of feature maps, whereby a plurality of 2D quality map samples corresponding to the plurality of different OCT volume samples are defined; and the method further comprises:

comparing the plurality of 2D quality map samples; and defining composite OCT data based on the highest or higher quality regions of the plurality of different OCT volume samples based on their respective 2D quality map samples.

* * * * *